United States Patent
Sanchez et al.

(10) Patent No.: US 11,041,281 B1
(45) Date of Patent: Jun. 22, 2021

(54) METHOD TO PRODUCE A WETCAST REVETMENT MAT

(71) Applicant: PREMIER CONCRETE PRODUCTS, INC., Baton Rouge, LA (US)

(72) Inventors: Blaine S. Sanchez, Baton Rouge, LA (US); Cary S. Goss, Baton Rouge, LA (US)

(73) Assignee: PREMIER CONCRETE PRODUCTS, INC., Baton Rouge, LA (US)

(*) Notice: Subject to any disclaimer, the term of this patent is extended or adjusted under 35 U.S.C. 154(b) by 2 days.

(21) Appl. No.: 16/552,258

(22) Filed: Aug. 27, 2019

Related U.S. Application Data

(63) Continuation of application No. 15/819,664, filed on Nov. 21, 2017, now Pat. No. 10,392,764.

(51) Int. Cl.
  *B29C 39/10* (2006.01)
  *E02B 3/12* (2006.01)
  *E02B 3/14* (2006.01)

(52) U.S. Cl.
  CPC .............. *E02B 3/123* (2013.01); *B29C 39/10* (2013.01); *E02B 3/14* (2013.01)

(58) Field of Classification Search
  None
  See application file for complete search history.

(56) References Cited

U.S. PATENT DOCUMENTS

| | | | | |
|---|---|---|---|---|
| 2,674,856 | A * | 4/1954 | Louckes ................. | E02B 3/123 405/20 |
| 4,370,075 | A * | 1/1983 | Scales ..................... | E01C 9/004 405/20 |
| 4,375,928 | A * | 3/1983 | Crow ...................... | E02B 3/123 405/17 |
| 4,499,664 | A * | 2/1985 | Scales ..................... | E02B 3/123 198/601 |
| 5,108,222 | A * | 4/1992 | Jansson ................... | E02B 3/123 405/15 |
| 5,632,571 | A * | 5/1997 | Mattox ............... | B28B 23/0012 405/19 |
| 7,048,469 | B1 * | 5/2006 | Jansson .................. | E01C 5/065 404/35 |
| 2002/0180076 | A1 * | 12/2002 | Motz ................... | B28B 23/0012 264/33 |
| 2013/0279983 | A1 * | 10/2013 | Benton, Jr. ........... | B28B 7/0064 405/20 |

\* cited by examiner

*Primary Examiner* — Edmund H Lee
(74) *Attorney, Agent, or Firm* — Roy Kiesel Ford Doody & North, APLC

(57) ABSTRACT

A method to produce a revetment mat. The method comprises the following steps: (a) positioning a first side of a grid adjacent to a mold; (b) positioning a frame adjacent to the second side of the grid opposite the mold to form a plurality of block casting impressions, wherein each block casting impression contains a portion of the grid; (c) filling the plurality of block casting impressions with a composite fill; (d) curing the composite fill, embedding within it the grid, to form a revetment mat; and (e) removing the revetment mat form the mold and the frame.

11 Claims, 23 Drawing Sheets

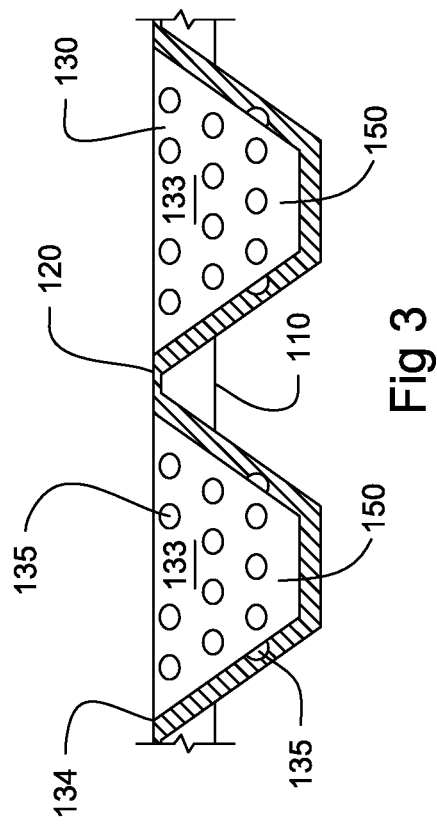
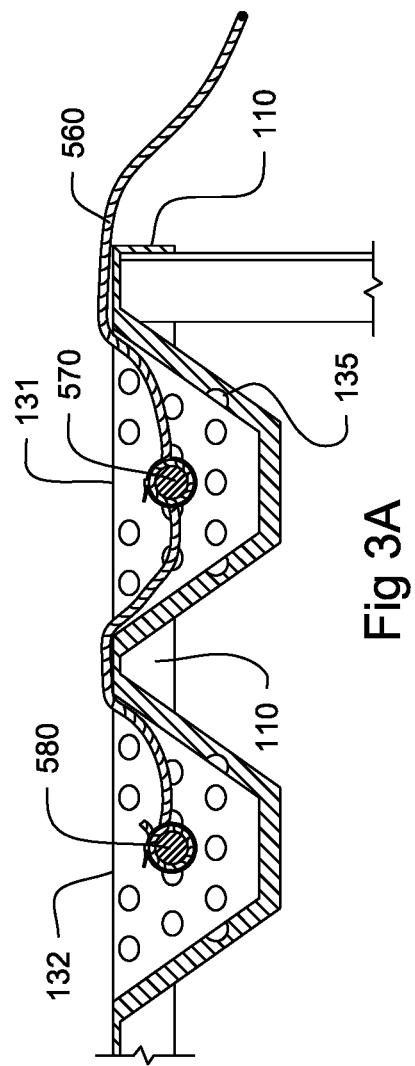

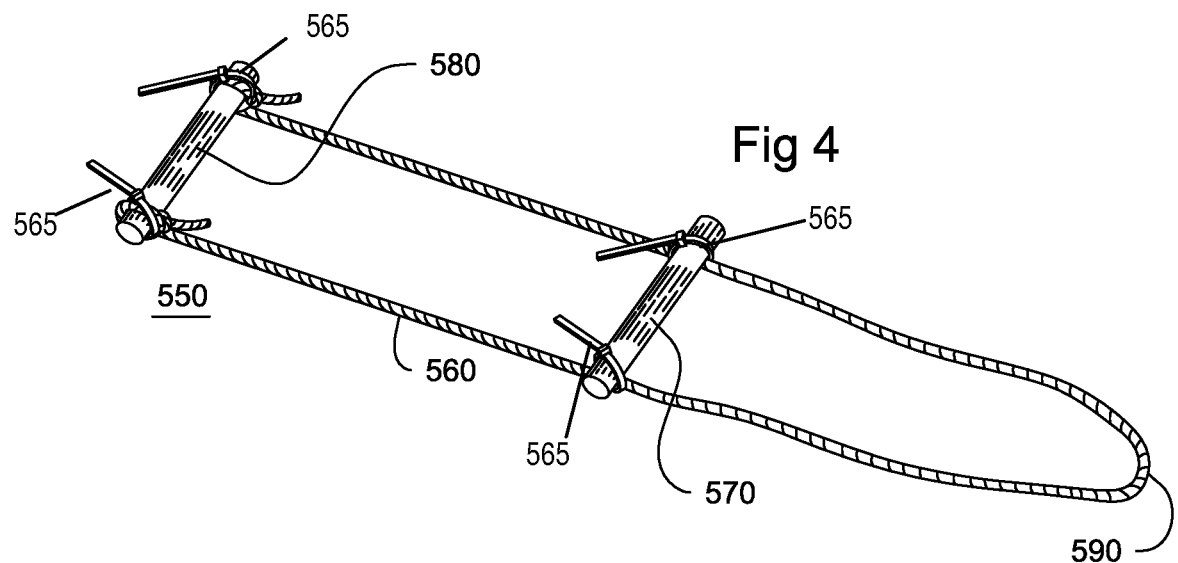
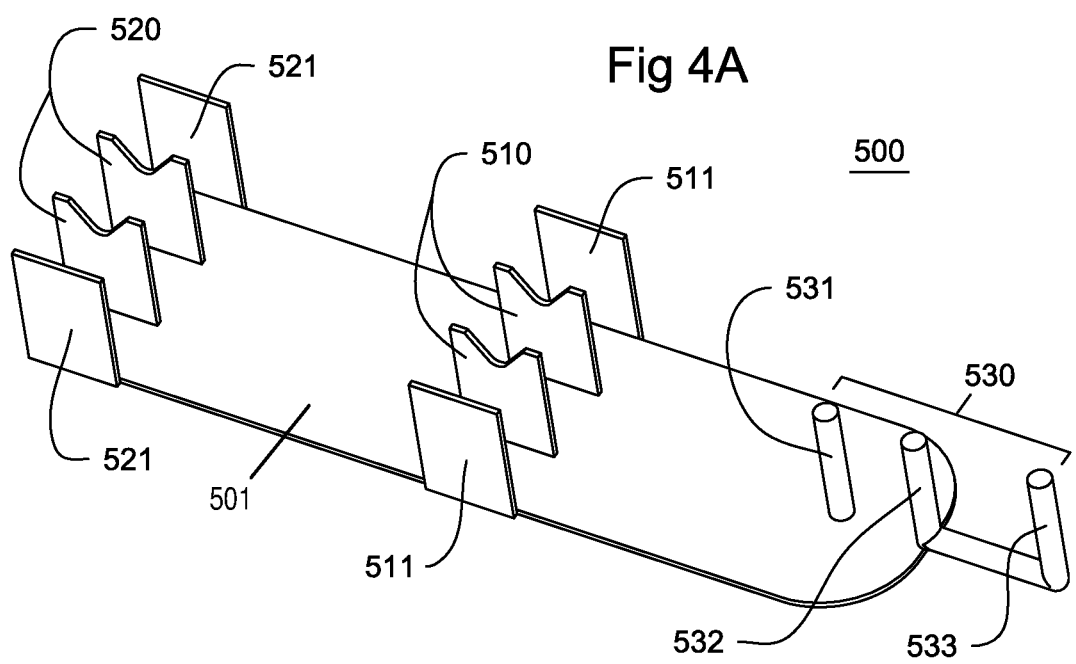

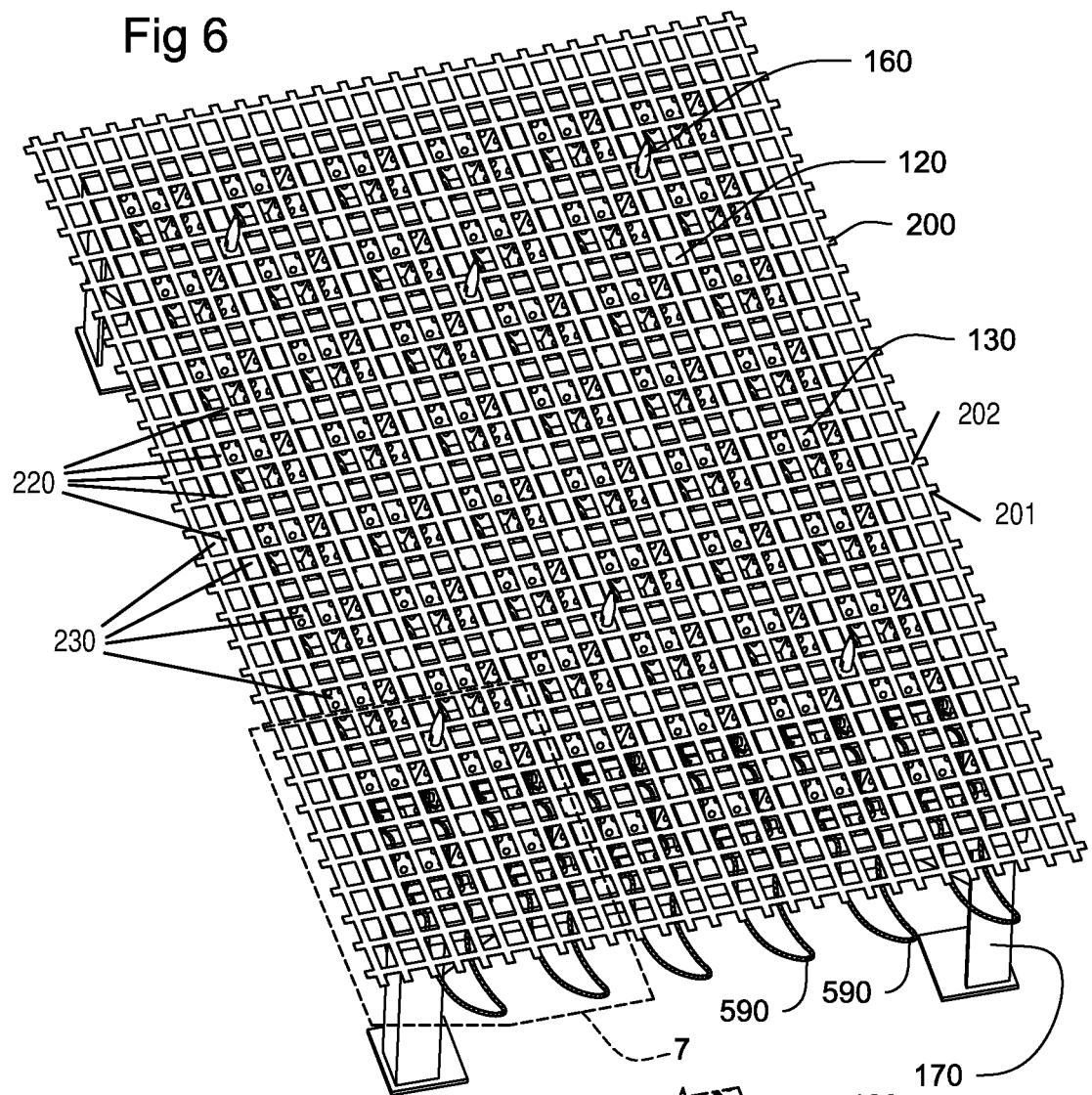
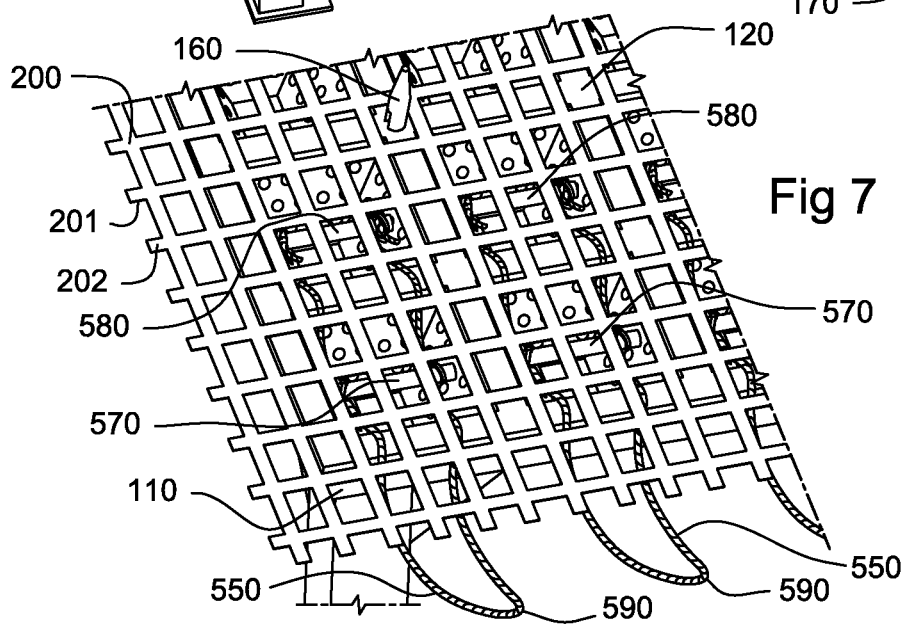

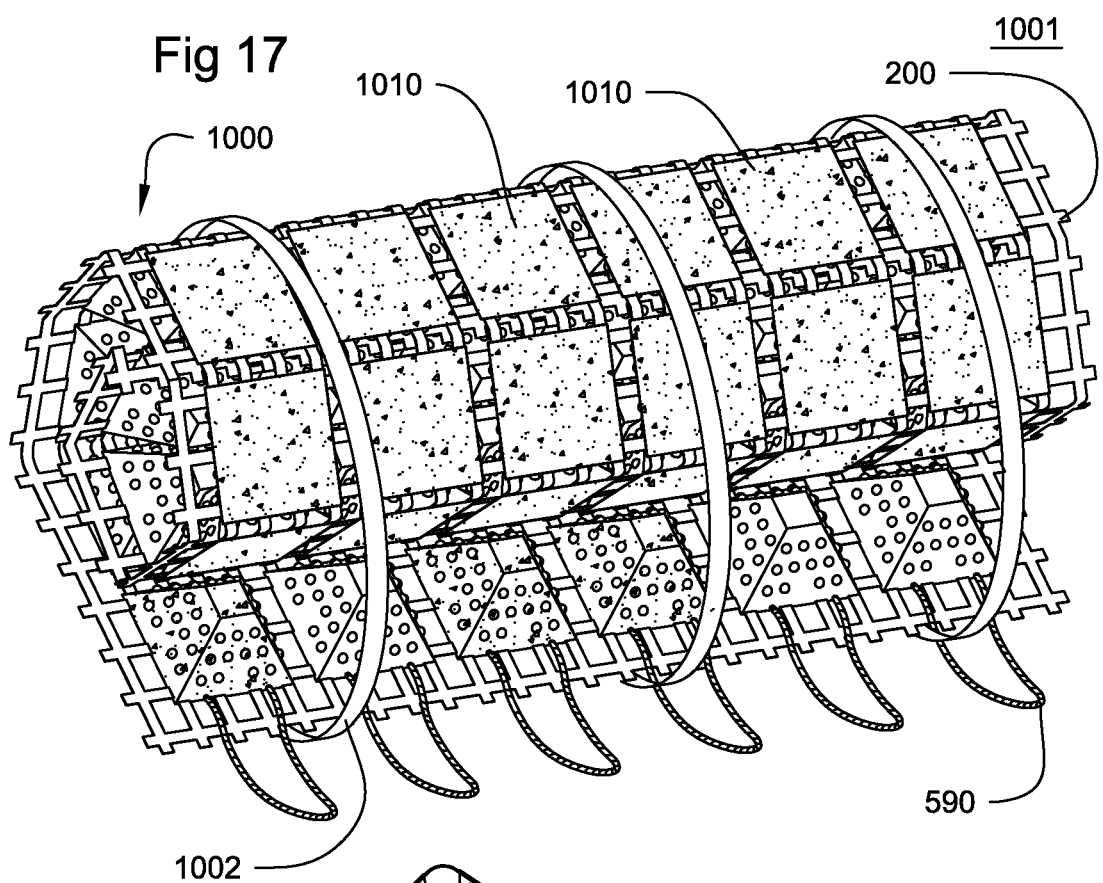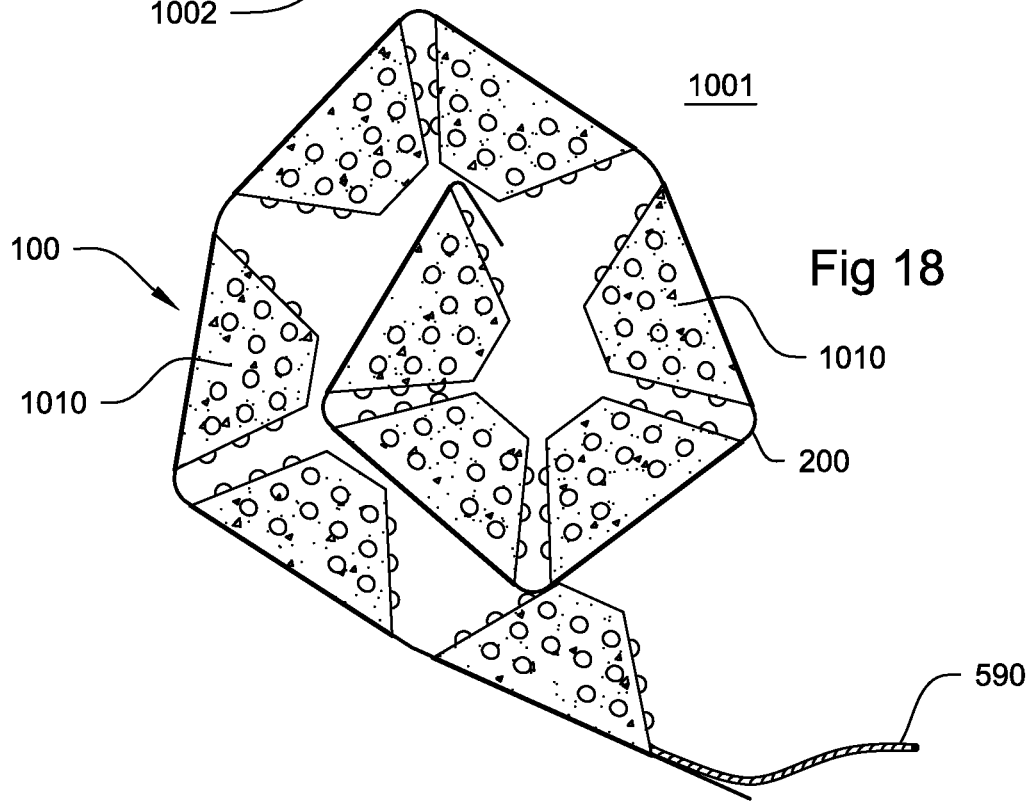

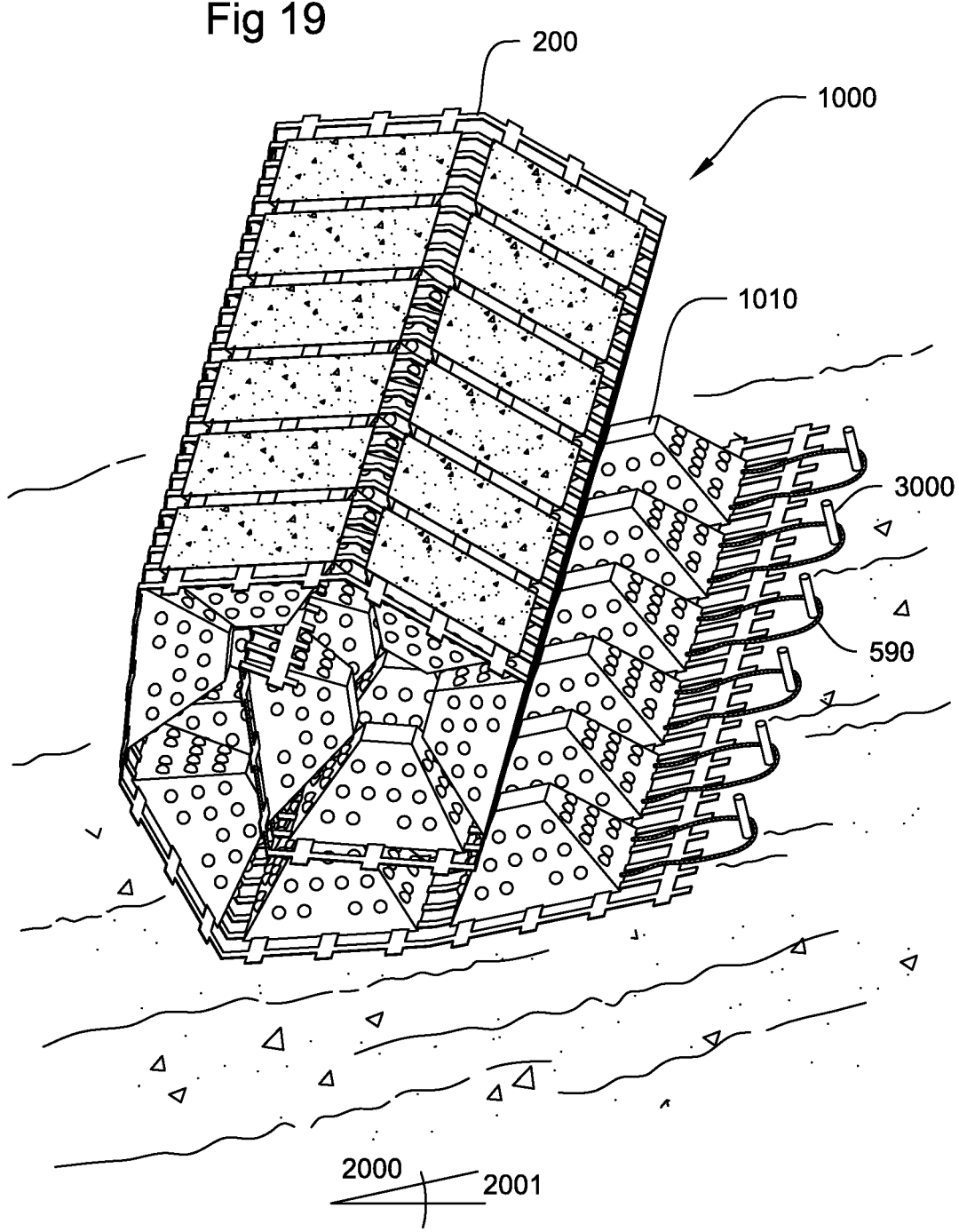

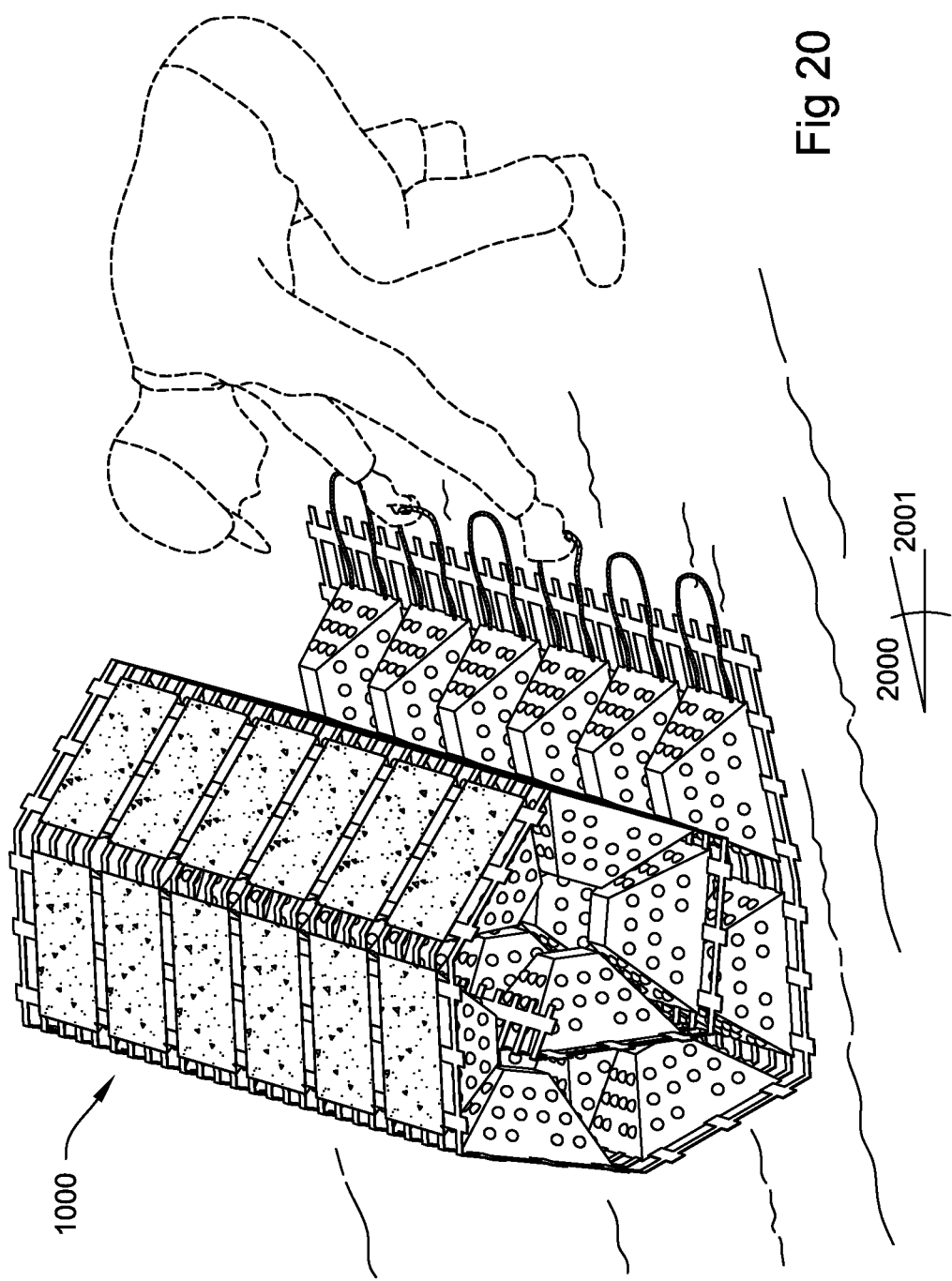

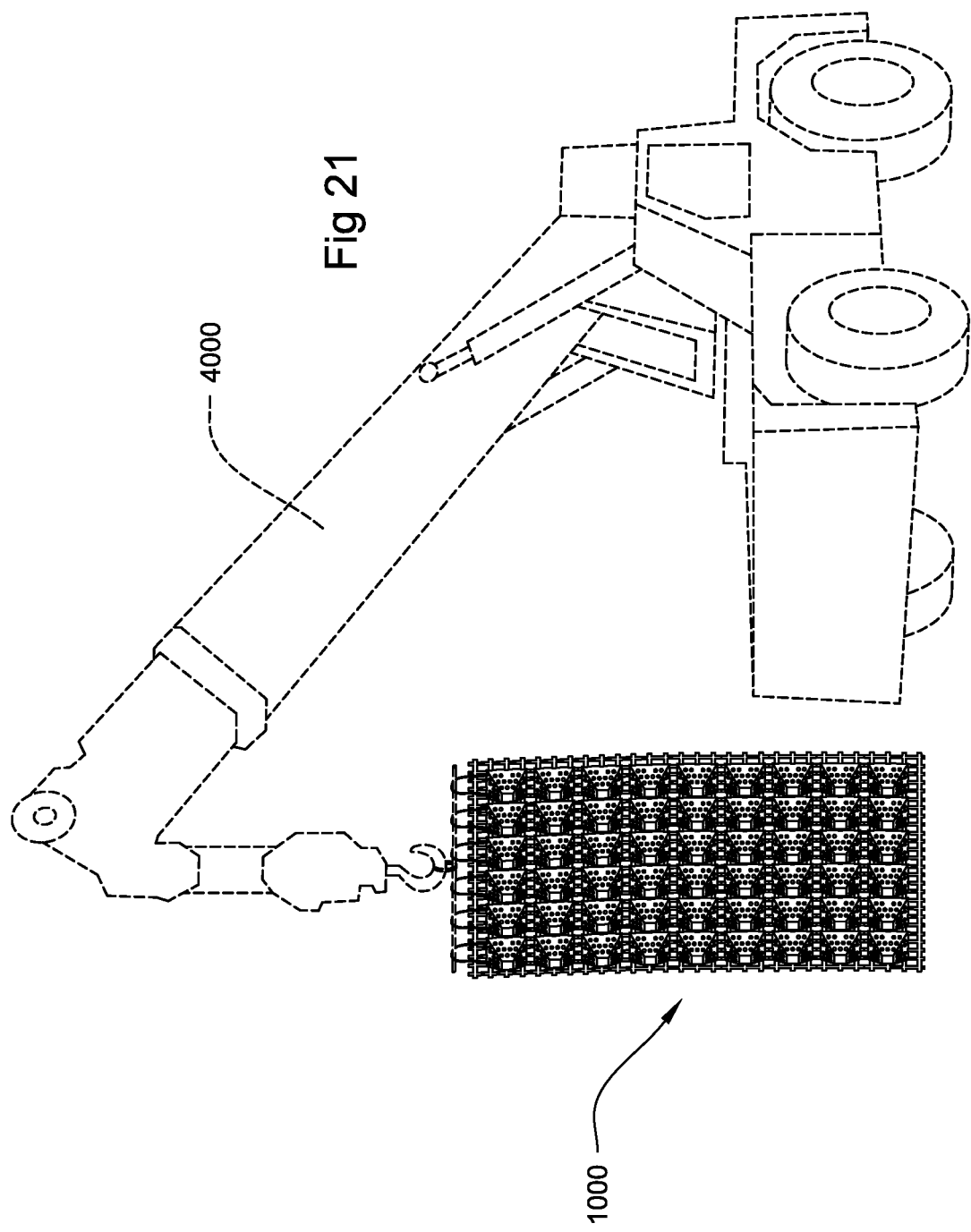

METHOD TO PRODUCE A WETCAST REVETMENT MAT

CROSS REFERENCE TO RELATED APPLICATION

This application claims the benefit of U.S. patent application Ser. No. 15/819,664, filed Nov. 21, 2017 issuing as patent Ser. No. 10/392,764 on Aug. 27, 2019, which is hereby incorporated by reference in its entirety.

BACKGROUND OF THE INVENTION

Field of Invention

Various embodiments relate to a method for the production of a revetment mat used to protect of earthen surfaces from fluid or hydraulic erosion. Various embodiments relate to a method for the production of a revetment mat including a plurality of revetment blocks arranged in an array and embedded on a common grid. Various embodiments relate to a method for the production of a revetment mat wherein a plurality of revetment blocks are simultaneously cast, each revetment block having embedded within it a section of a common grid.

General Background of the Invention

It is well known that fluid (gaseous or aqueous) erosion increases as the velocity of fluid flowing across earthen surfaces increases. It is also well know that revetment mats decrease the velocity of fluid thereby impeding fluid erosion It is also well known in the prior art that revetment mats are created and installed in several ways. One method of producing a revetment mat is known wherein block are cast individually then subsequently installed in an array on the earthen surface.

Another method of producing a revetment mat is known wherein blocks are cast individually then subsequently cabled together to form a mat. Cabling can be done before or after the blocks are installed in an array on the earthen surface subject to fluid erosion.

There is a need in the art for a method to produce a revetment mat wherein the casting process results in a connected arrangement of the blocks.

A method exists teaching a casting process producing a connected arrangement of blocks. See herein incorporated by reference U.S. patent Ser. No. 10/239,240. However, the method disclosed requires complex machinery with limited application.

There is a need in the art to provide for a method to produce a revetment wherein the casting process of each block results in a connected arrangement of the blocks that does not require complex machinery with limited application.

SUMMARY OF THE INVENTION

Various embodiments relate to a method to produce a composite revetment mat. The method comprises the following steps: (a) positioning a first side of a grid adjacent to a mold; (b) positioning a frame adjacent to the second side of said grid opposite said mold to form a block casting impression containing a portion of said grid; (c) filling said block casting impression with a composite fill; (d) curing said composite fill embedding said grid within to form a revetment mat; and (e) removing said revetment mat form said mold and said frame.

BRIEF DESCRIPTION OF THE DRAWINGS

FIG. 3 is a view of the mold of FIG. 1 down Line 3 shown in FIG. 1 showing the cross section of two adjacent casting impressions.

FIG. 3A is a view of the mold of FIG. 1 down line 3A shown in FIG. 1 showing the cross section of two adjacent casting impressions with one embodiment of a handle positioned within the casting impressions.

FIG. 4 is a view of the one embodiment of the handle shown in FIG. 3A that may be used in the method.

FIG. 4A is a view of one embodiment of a frame that may be used to make the handle shown in FIG. 4.

FIG. 6 is a view of one embodiment of a grid that may be used in the method positioned adjacent to the mold shown in FIG. 1.

FIG. 7 is a view through Window 7 show in FIG. 6 showing of the grid, the mold and at least two handles, all shown in FIG. 6.

FIG. 17 is a view of the revetment mat shown in FIG. 15 rolled and strapped for packaging and storage.

FIG. 18 is another view of the revetment mat shown in FIG. 17.

FIG. 19 is a view of the revetment mat shown in FIG. 15 being installed on an earthen surface.

FIG. 20 is another view of the revetment mat shown in FIG. 15 being installed on an earthen surface.

FIG. 21 is a view of the revetment mat shown in FIG. 15 being lifted for installation by a front loader or other heavy equipment.

DETAILED DESCRIPTION

The figures provided herein depicts two preferred embodiment of the method among a plurality of preferred embodiments for the production of revetment mat 1000 comprising grid 200 embedded into a plurality of blocks 1010.

Figure 10:
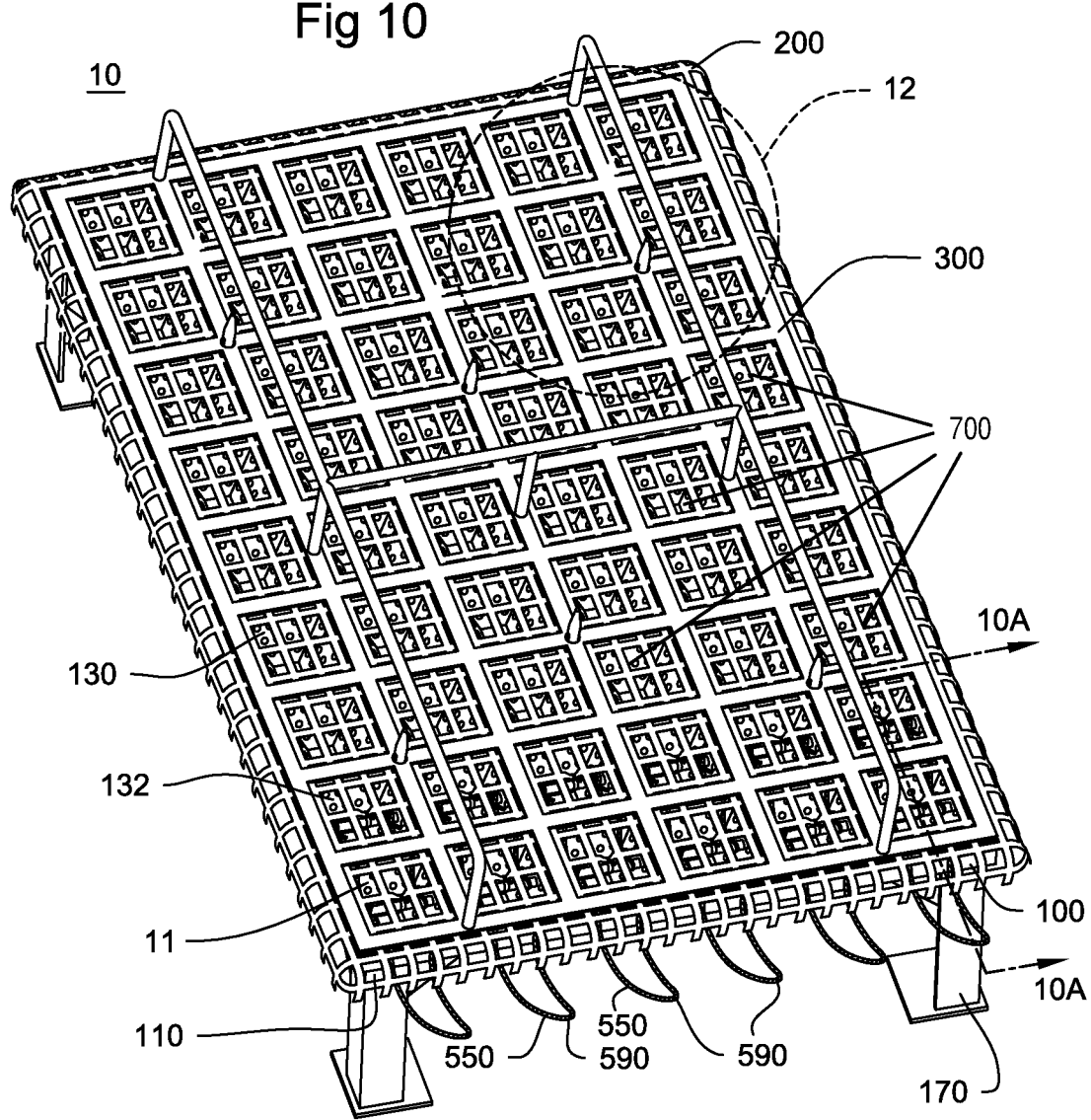
FIG. 10 is a view of the frame shown in FIG. 9 being positioned adjacent the grid and the mold shown in FIG. 6.
Figure 10A:
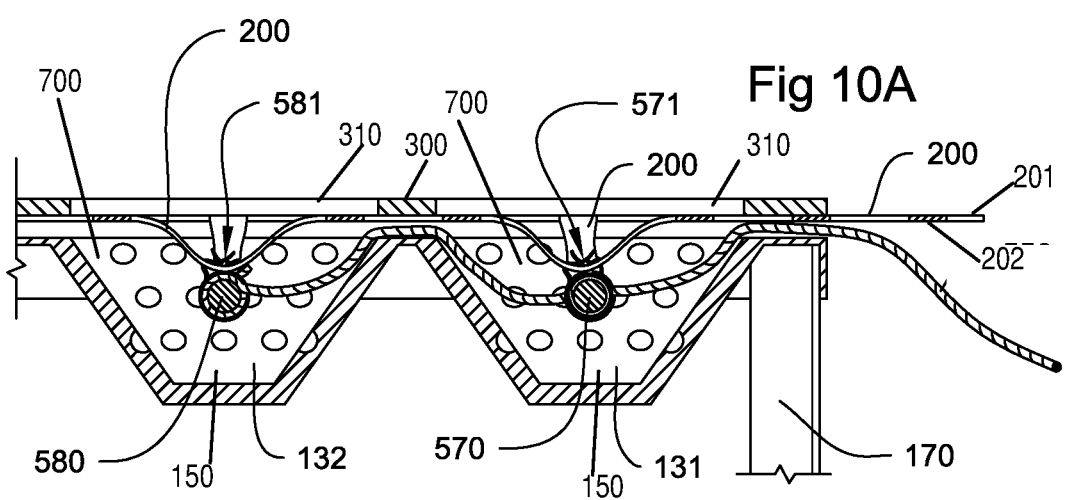
FIG. 10A is a view down line 10A shown in FIG. 10 showing the cross section of two adjacent casting impressions, a handle similar to the one shown in FIG. 4 positioned adjacent the mold, the grid positioned adjacent to the mold, the anchors tied to the grid, and frame positioned adjacent the grid.
Figure 11:
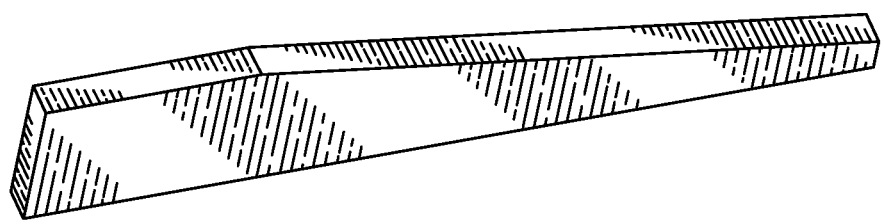
FIG. 11 is a view of one embodiment of a wedge.

Viewing now FIGS. 10 and 10A, to form a plurality of casting block volumes 700 with each volume containing a section of grid 200 to be imbedded, first side 201 of grid 200 is positioned adjacent to mold 100 and frame 300 is positioned adjacent second side 202 of grid 200 opposite mold 100. Mold 100, grid 200 and frame 300 are further described in detail.

Figure 1:
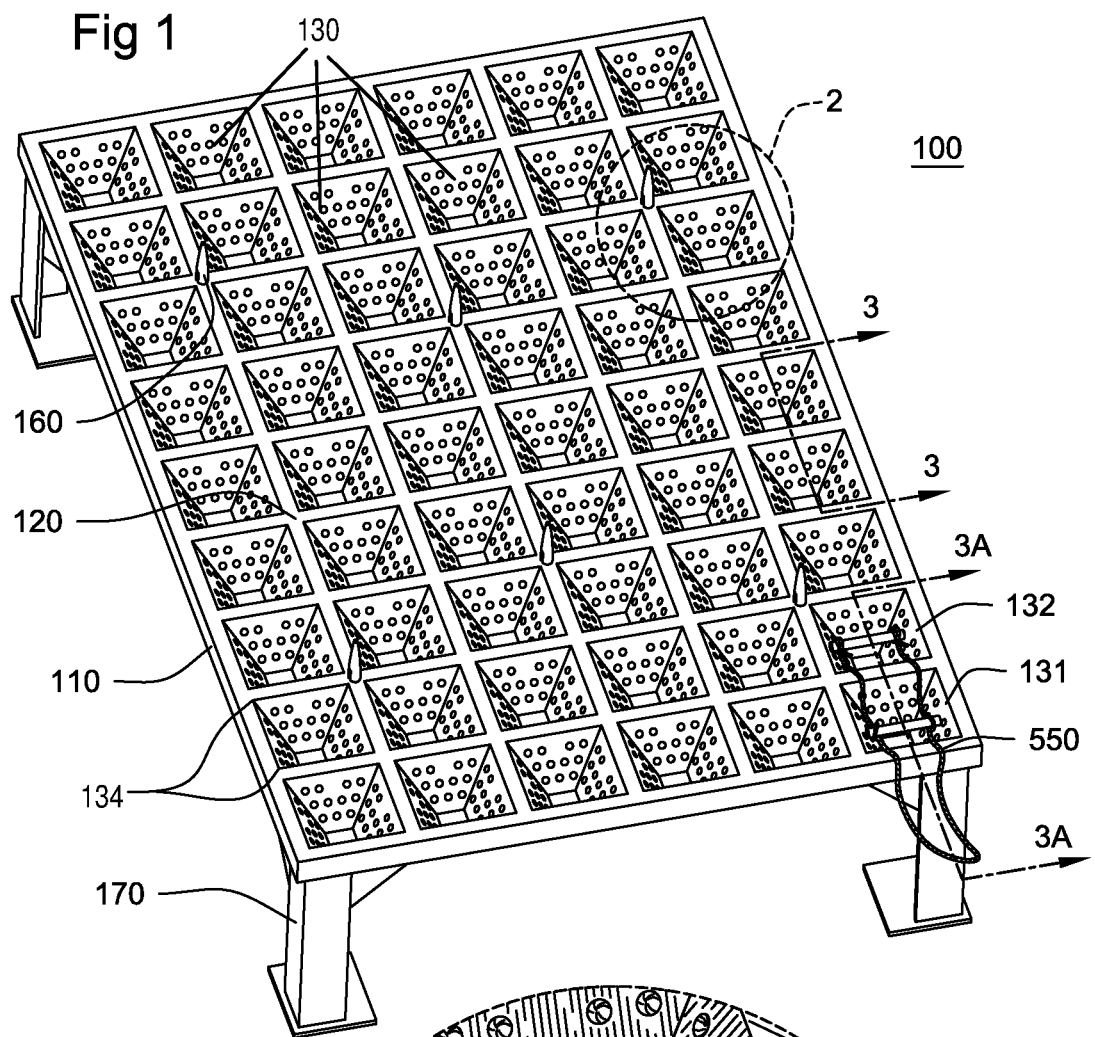
FIG. 1 is a view of one embodiment of a mold that may be used in the method comprising a plurality of casting impressions.

Viewing now FIG. 1, the method employs mold 100. In various embodiments, mold 100 comprise side wall 110 forming a mold perimeter, a mold surface 120 affixed to side wall 110, and at least one casting impression 130 affixed to mold surface 120 such that mold surface 120 forms a border between casting impressions.

In various embodiments as depicted in the figures, mold 100 comprises a plurality of casting impressions 130 arranged in a six (6) by nine (9) array. It should be understood that mold 100 could comprises a variety of arrangements, such that mold 100 may include only one casting impression 130 or may include another arrangement such as an array of five (5) by ten (10) casting impressions 130. Further it should be understood that several molds 100 may be positioned adjacent to one another to form a larger revetment mat then a single mold may create. For example, FIGS. 22 through 27 depict various steps in one embodiment of the method wherein six (6) molds 100, each having a plurality of casting impressions arranged in a six (6) by nine (9) array, are positioned adjacent one another in a two (2) by three (3) arrangement to create revetment mat 1000. Further, it should be understood that while a plurality of molds 100 each comprising only one (1) casting impression could be positioned adjacent to one another to form a revetment mat, it is a preferred embodiment to use a mold with a plurality of casting impressions. Further, when two or more molds 100 are positioned adjacent to one another, in various embodiments side wall 110 and perimeter 111 of molds 100 are configured to facilitate one mold 100' being positioned adjacent to another mold 100". For example flush side walls 110 and a rectilinear perimeter 111 of molds 100 would facilitate positioning one mold 100' adjacent to another mold 100". When two or more molds 100 are positioned adjacent to one another, in various embodiments, mold surface 120 of one mold 100' is positioned adjacent to and long the same plane as a second mold surface 120 of a another mold 100".

Figure 2:
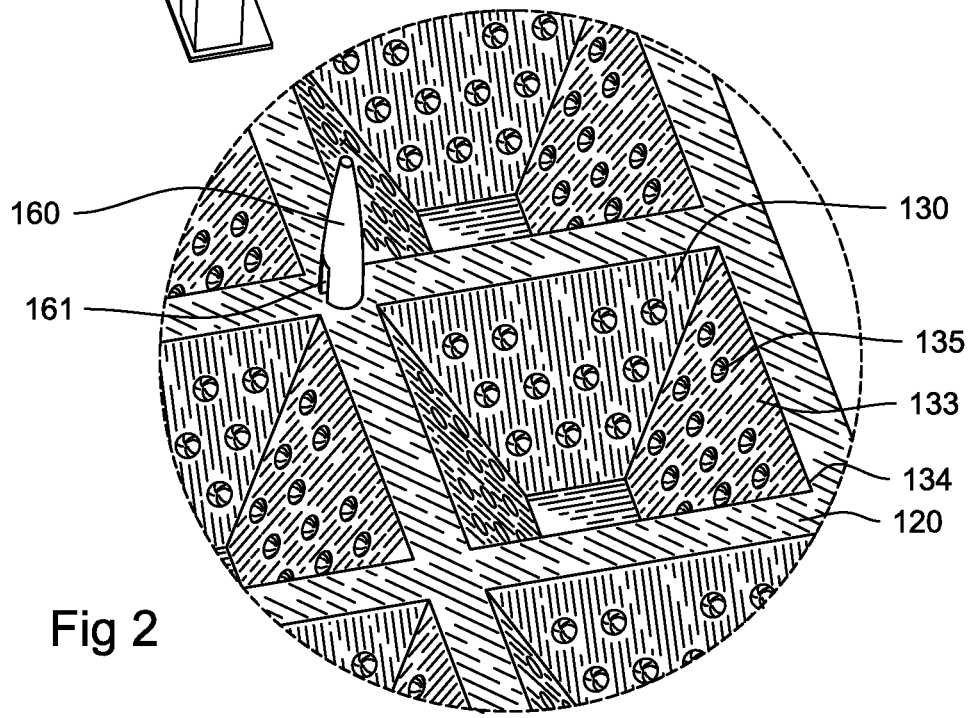
FIG. 2 is a view of the mold of FIG. 1 through Window 2 shown in FIG. 1.

Viewing now FIGS. 2 and 3, in various embodiments, casting impression 130 comprises impression wall 133 affixed to mold surface 120, opening 134 at mold surface 120, and casting impression volume 150 defined by impression wall 133 and opening 134. In various embodiments, impression wall 133 comprises hydraulic jump impressions 135. It is well known in the art that hydraulic jumps impede fluid flow.

Viewing now FIG. 6, the method employs grid 200. In FIG. 6, first side 201 of grid 200 has been positioned adjacent to mold 100. In various embodiments, grid 200 comprises plurality of elements 220 extending from at least one edge of the grid, and a plurality of apertures 230 formed between the plurality of elements 220. In various embodiments, the apertures 230 have an aperture radius defined by the largest sphere which may pass through the narrowest point of the aperture 230 without contacting the elements 220 forming the aperture 230. In various embodiments, aperture radius falls anywhere in the range of 0.75 inches and one (1) inch. In various embodiments, said elements 220 comprise of poly-propylene fibers.

When first side 201 of grid 200 is positioned adjacent to a mold 100, the first side 201 of grid 200 is positioned adjacent to mold surface 120. Further, when a first side 201 of grid 200 is positioned adjacent to a mold 100, the first side 201 of grid 200 is also positioned adjacent to casting impression openings 134 at mold surface.

Figure 23:
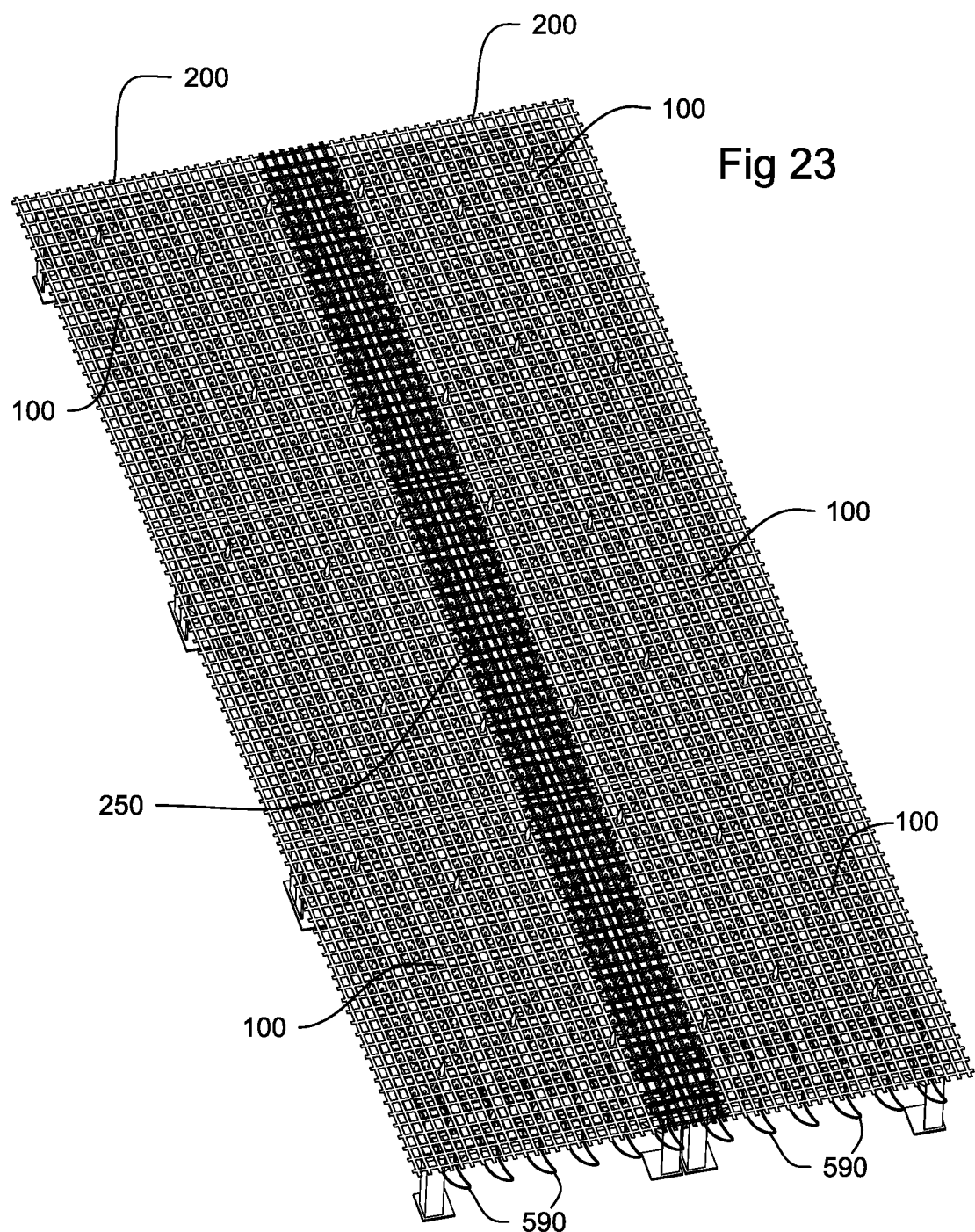
FIG. 23 is a view of two sections of grid positioned adjacent the six molds shown in FIG. 22.
Figure 24:
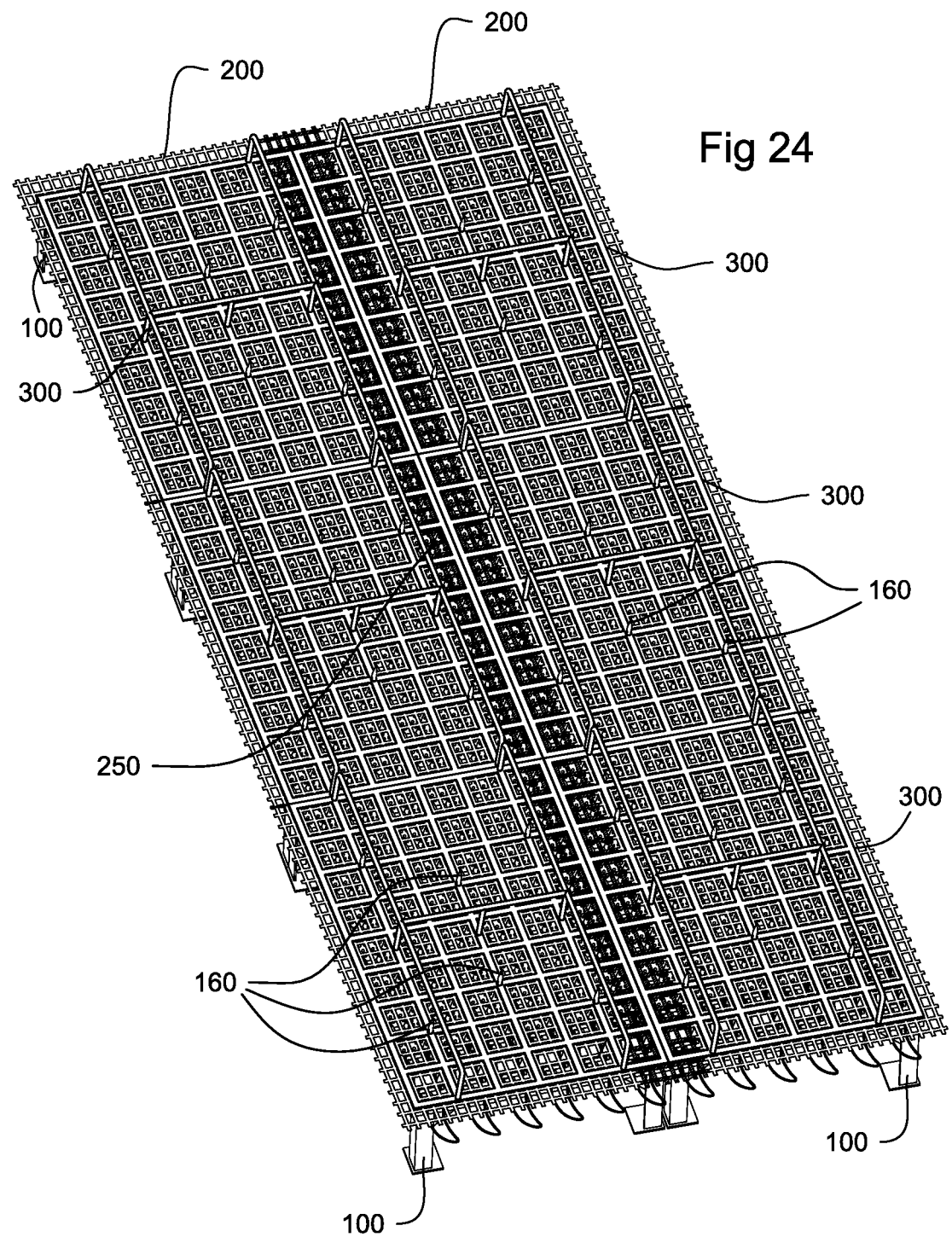
FIG. 24 is a view of six frames, each frame similar to the one shown in FIG. 9, positioned adjacent to the six molds shown in FIG. 22 opposite the two grids shown in FIG. 23.
Figure 25:
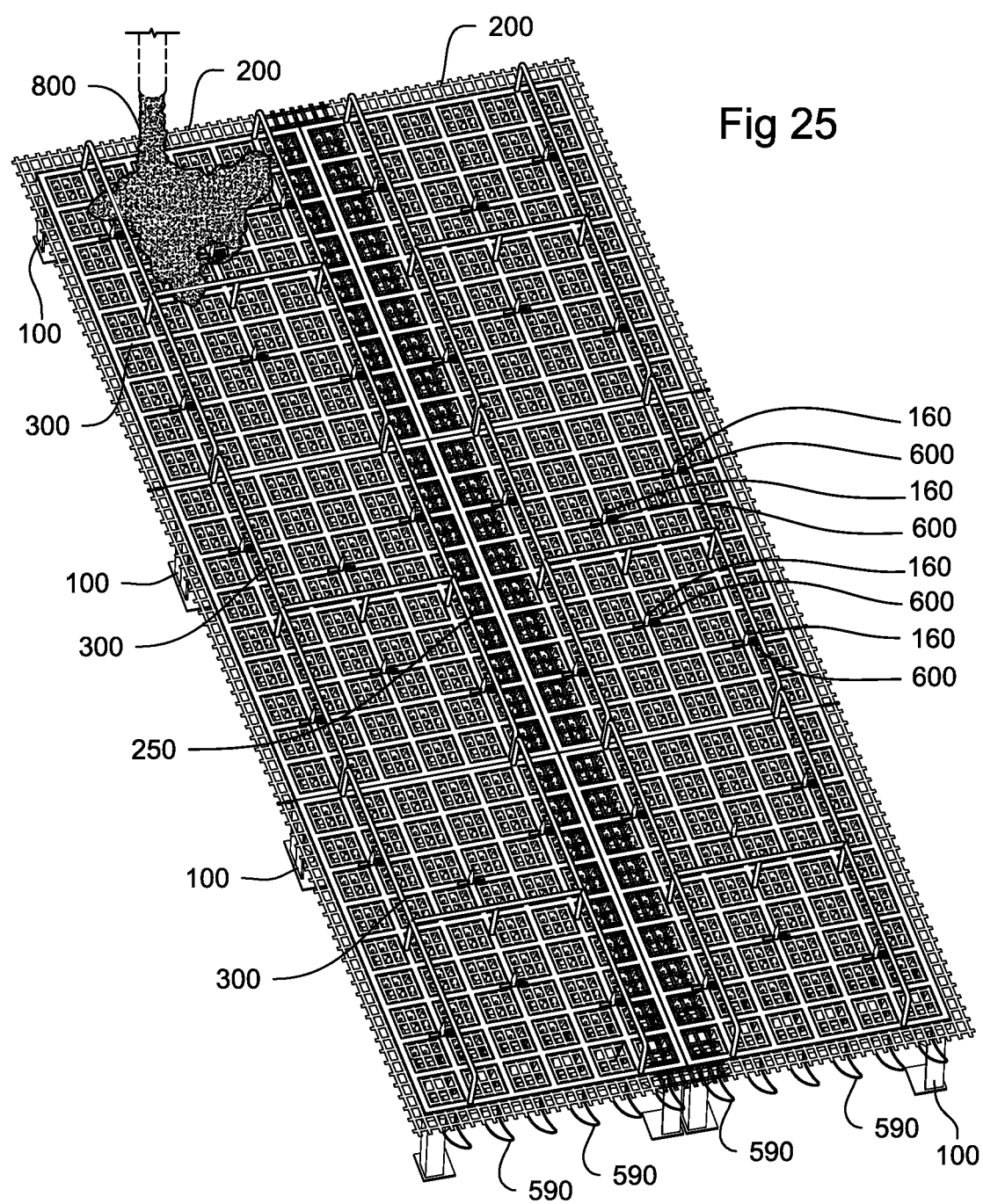
FIG. 25 is a view of one embodiment of composite fill being poured through the six frames and into the six molds shown in FIG. 24.
Figure 26:
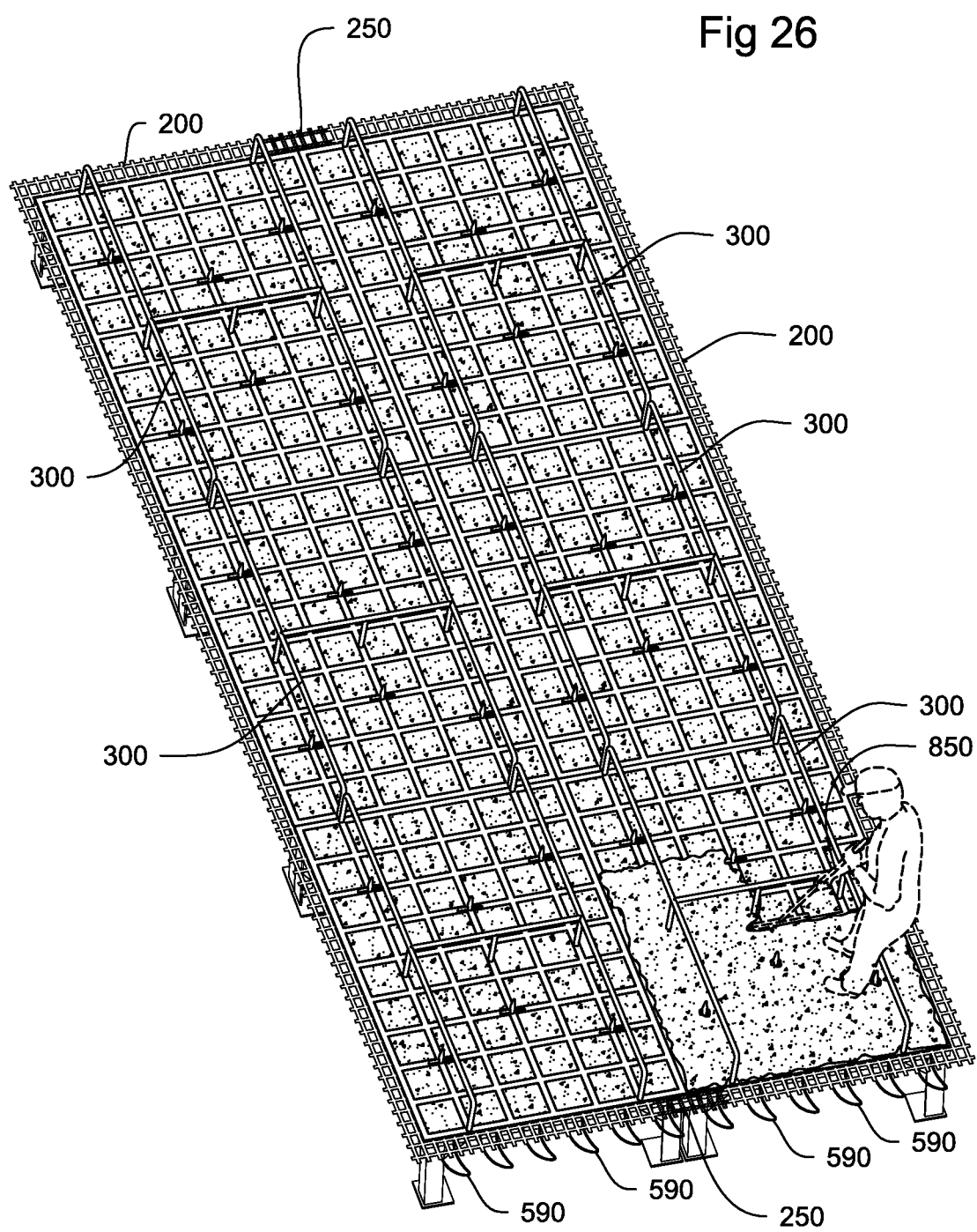
FIG. 26 is a view of a person screening composite fill across the surface of the six frames shown in FIG. 24.
Figure 27:
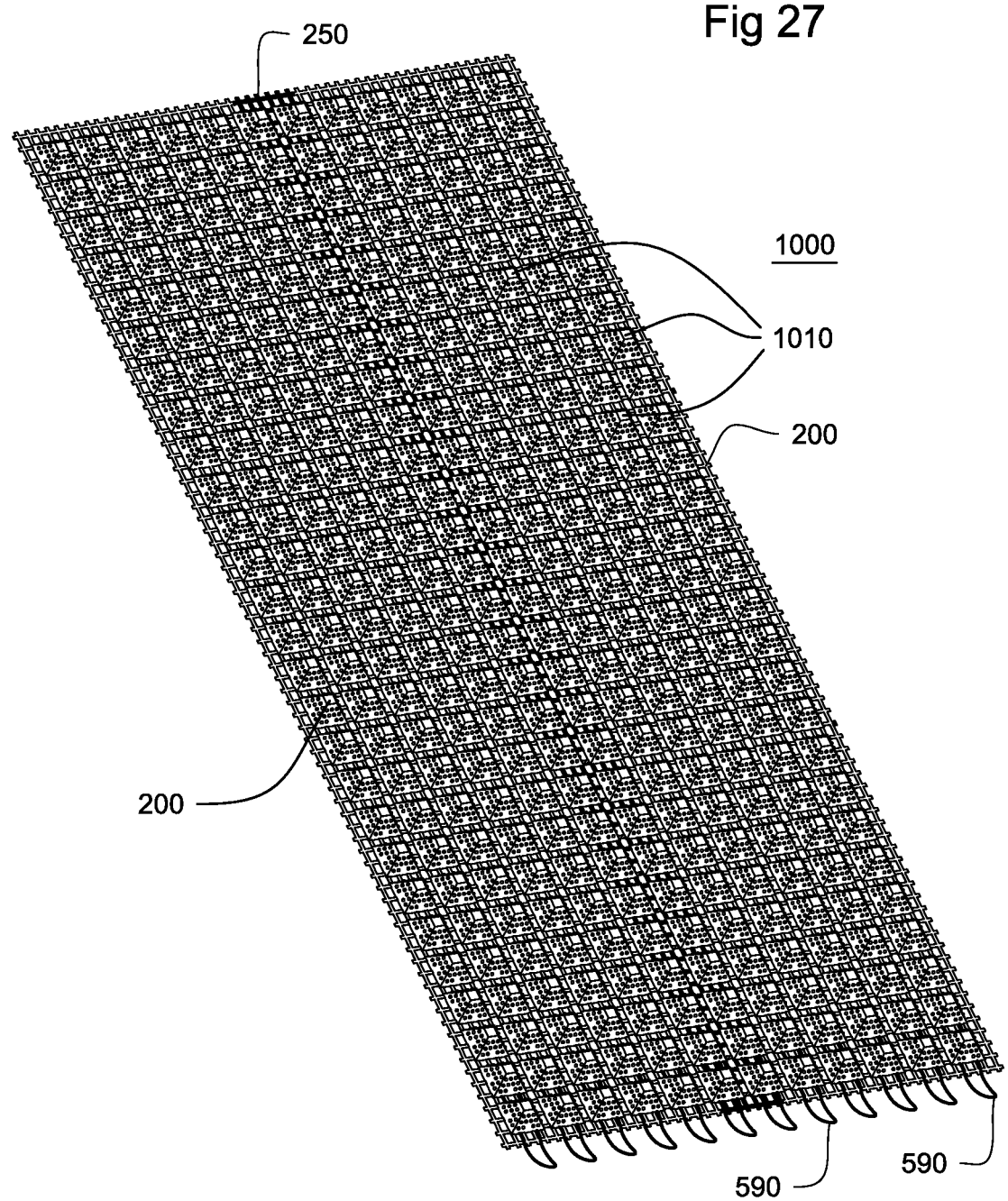
FIG. 27 is a view of a revetment mat using the six molds and six frames shown in FIG. 24.

It should be understood that the size and shape of the grid 200 does not necessarily need to correspond with or exceed the size and shape of the perimeter of mold 100. Generally, commercial grids such as those comprising poly-propylene fibers are packaged in rolls having a width and a length, the length being cut to size when positioning a section of grid 200 adjacent to mold 100 or several molds 100 positioned adjacent to one another. Thus in various embodiments as depicted in FIG. 6, the width and length of grid 200 exceeds the width and length of mold 100. In various embodiments as depicted in FIG. 23, the width of grid 200 exceeds the width of one mold 100 and the length of grid 200 exceeds the length of three molds positioned adjacent to one another. Where the width of grid 200 is insufficient to span the width of mold 100 or two adjacent molds 100 as depicted in FIG. 23, a second grid 200 may be positioned adjacent to the mold 100 or adjacent molds 100 so that cumulatively the grids 200 exceed the width of the mold 100 or adjacent molds 100. When two or more grids 200 are positioned to exceed the width of one mold 100 or adjacent molds 100, it is a preferred embodiment of the method to partially overlap 250 the two or more sections of grid 200 such a portion of the overlap is positioned to become commonly embedded in at least one revetment block 1010 to prevent the separation of the grids 200 when revetment mat 1000 is removed from frame 300 and mold 100.

Figure 9:
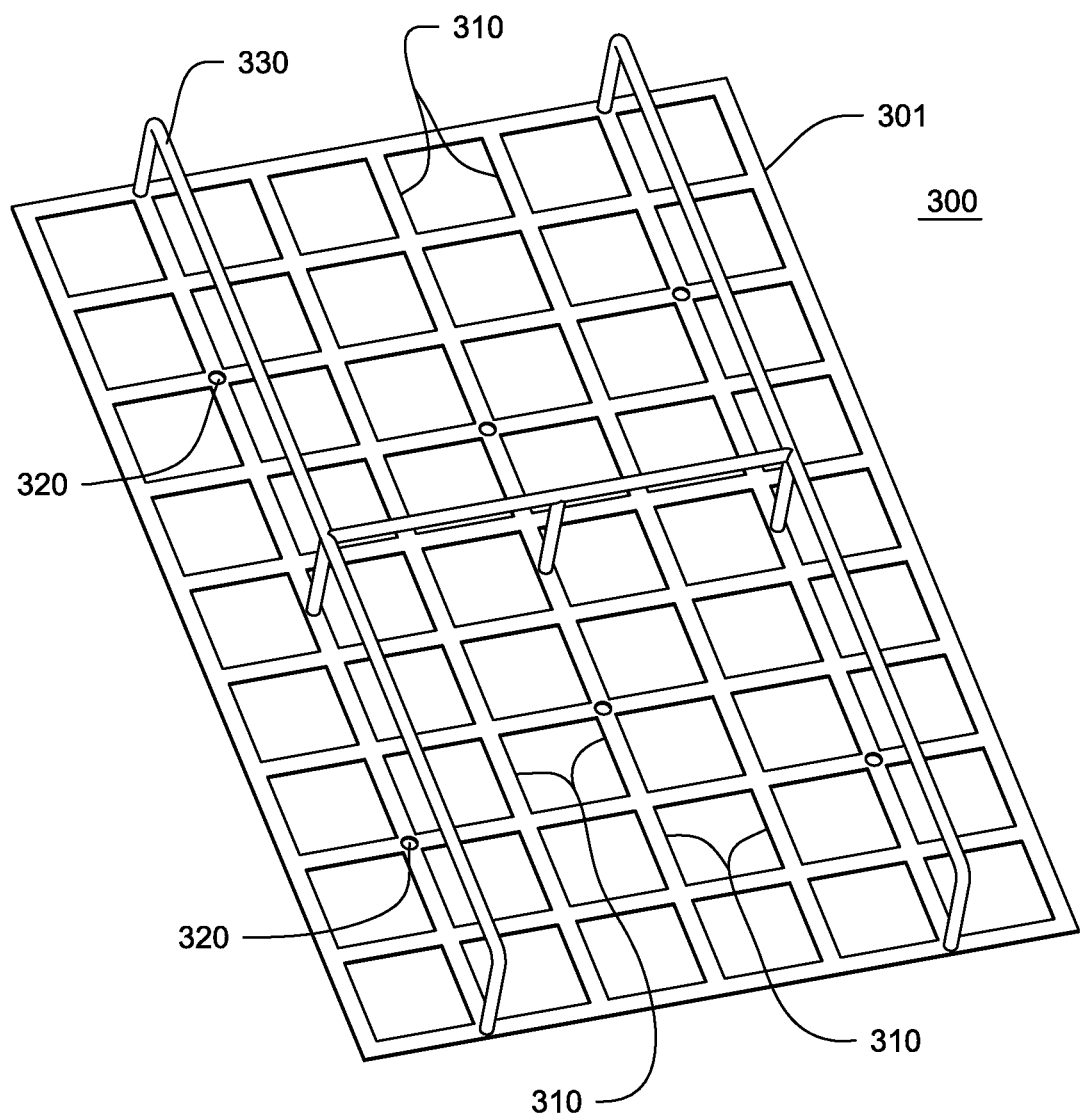
FIG. 9 is a view of one embodiment of a frame comprising a plurality of passages.

Viewing now FIG. 9, the method employs frame 300. In various embodiments, frame 300 comprises body 301 having a first and second side, a plurality of casting passages 310 through body 301, wherein body 301 forms border around each casting passage 310. Frame 300 grip 330 affixed to the second side of body 301. Casting passage 310 of frame 300 is designed to correspond with casting impression 130 of mold 100. It should be understood that the number, arrangement, size and shape of casting passages 310 does not need to correspond with the number, arrangement, size and shape of casting impressions 130 of mold 100. However, do to certain efficiencies, it is a preferred embodiment that the number, arrangement, size and shape of casting passages 310 correspond with the number, arrangement, size and shape of casting impressions 130 of mold 100.

Viewing now FIGS. 10 and 10A, when first side 201 of grid 200 is positioned adjacent to mold 100 and frame 300 is positioned adjacent second side 201 of grid 200 opposite mold 100, each of the plurality of casting impressions 130 of mold 100 is fluidly connected to a casting passage 310 of frame 300 to form a plurality of block casting volumes 700, each volume containing a section of grid 200.

"Fluid connection" describing the relation between casting impression 130 and casting passage 310 when first side 201 of grid 200 is positioned adjacent to mold 100 and frame 300 is positioned adjacent second side 202 of grid 200 as used herein encompasses the capacity of composite fill 400 to flow through casting passage 310, through grid 200 and into casting impression 130 either passively aided only by gravity or in combination with mechanical means including by not limited to screening, injecting, and vibrating.

Figure 13:
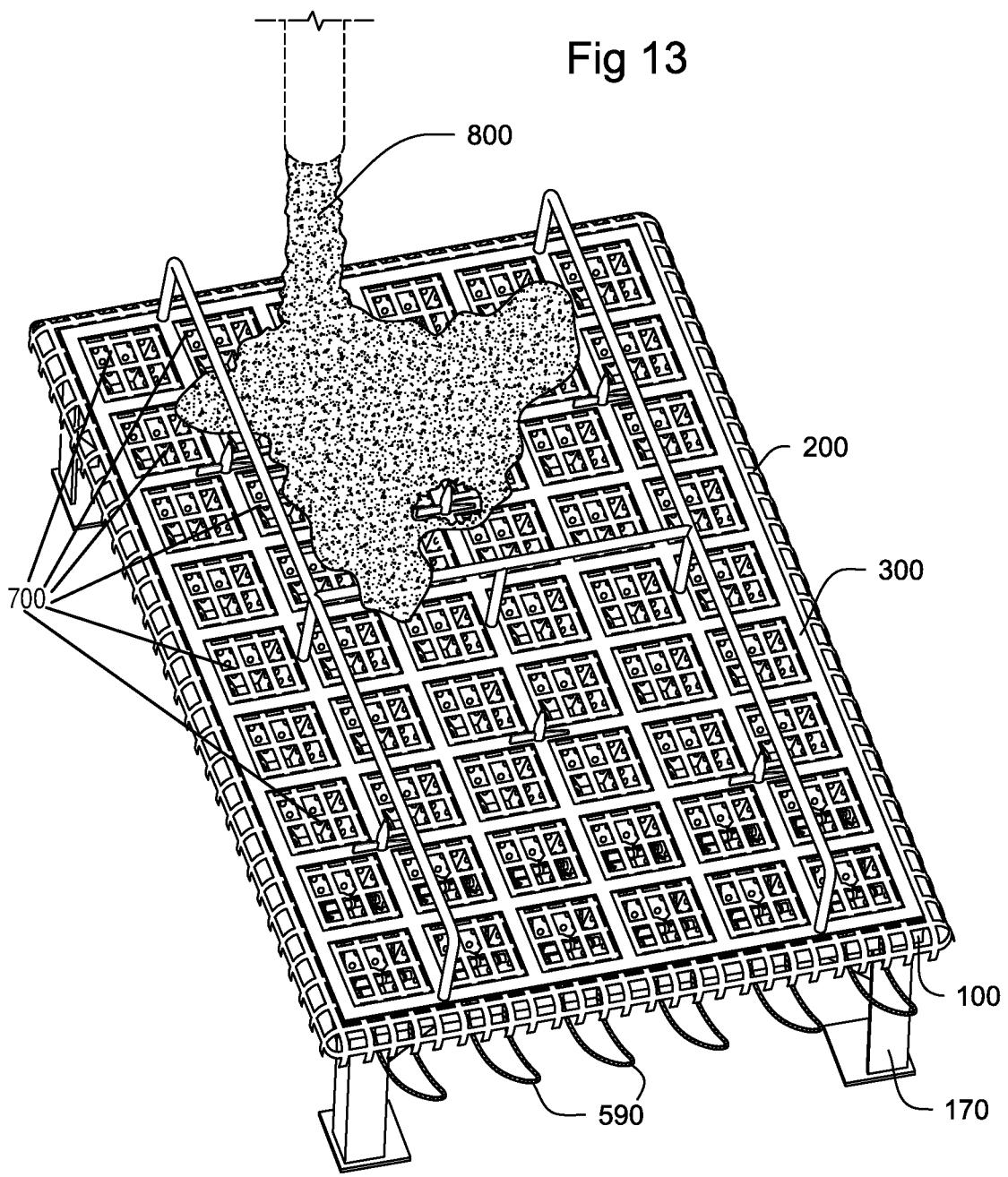
FIG. 13 is a view of one embodiment of composite fill being poured through the frame shown in FIG. 9 and into the plurality of impressions of mold shown in FIG. 1.

Viewing now FIG. 13, to form revetment mat 1000 comprising grid 200 embedded within a plurality of blocks 1010, composite fill 800 is positioned within the plurality of block casting volumes 700 embedding grid 200 with composite fill 800.

In various embodiments, composite fill 800 is a hardenable paste. In various embodiments composite fill 800 comprises cement paste such as wet cast Portland cement. In various embodiments, composite fill 800 comprises a powder to solid or liquid to solid polymers including for example and without limitation thermosetting resins such as epoxy resins, UV-setting resins such as acrylated urethanes, or heat binding powders such as powdered metals used in direct metal laser sintering. In various embodiments, composite fill 800 further comprises aggregates including but not limited to sand, gravel, or both sand and gravel. Aggregates have an aggregate radius defined by one half of the longest dimension of aggregate used, which in a preferred embodiment is smaller than the aperture radius of apertures 230.

"Fluid connection" describing the relation between casting impression 130 and casting passage 310 when first side 201 of grid 200 is positioned adjacent to mold 100 and frame 300 is positioned adjacent second side 202 of grid 200 as used herein encompasses the capacity of composite fill 400 to flow through casting passage 310, through grid 200 and into casting impression 130 either passively aided only by gravity or in combination with mechanical means including by not limited to screening, injecting, and vibrating. Therefore, it should be understood that "fluid connection" between mold 100 and frame 300 take into consideration, among other things, the viscosity of composite fill 400, the difference between aperture radius 230 and aggregate radius, and the use of mechanical means.

In various embodiments, composite fill 800 positioned with each block casting volume 700 must cure for a predetermined amount of time to from revetment mat 1000. In various embodiments, heat may be added to accelerate the curing process. Once formed, revetment mat 1000 is removed from mold 100 and frame 300. In various embodiments, composite fill 800 only partially cures before revetment mat 1000 is removed from mold 100 and frame 300.

It may be desired that revetment mat 1000 comprises at least one handle. In various embodiments, method may employ handle 550. While FIG. 1 depicts only one handle 550, it should be understood and as is illustrated in other figures, several handles may be positioned adjacent mold 100.

Viewing now FIG. 4, handle 550 comprises tether 560 attached to first and second anchors 570, 580. Tether 560 may be attached to anchors 570, 580 via tether ties 565, as depicted in the figures, via a knot with tether 550 around anchor 570, 580, not depicted, or any other known means of securing a tether to an anchor. Tether 560 also forms hold 590.

As depicted in FIG. 3A, in various embodiments, first anchor 570 is positioned within first casting impression 131 proximate mold perimeter, second anchor 580 is positioned within second casting impression 132 adjacent first casting impression 131, and hold 590 is positioned beyond mold perimeter.

Viewing now FIG. 4A, handle frame 500 used to construct handle 550 comprises base 501, first and second anchor supports 510, 520 attached to base and first and second guide 511, 521 attached to base 501, and hold guide 530 comprising first, second, and third hold guides 531,532, 533 attached to base 501. In various embodiments, the distance between first anchor support 570 and second anchor support 580 is drawn to the distance between adjacent first and second casting impressions 131, 132, such that first anchor 570 may sit proximate the middle of first casting impression 131 and that second anchor 580 may sit proximate the middle of second casting impression when handle 550 is positioned adjacent mold.

Figure 4B:
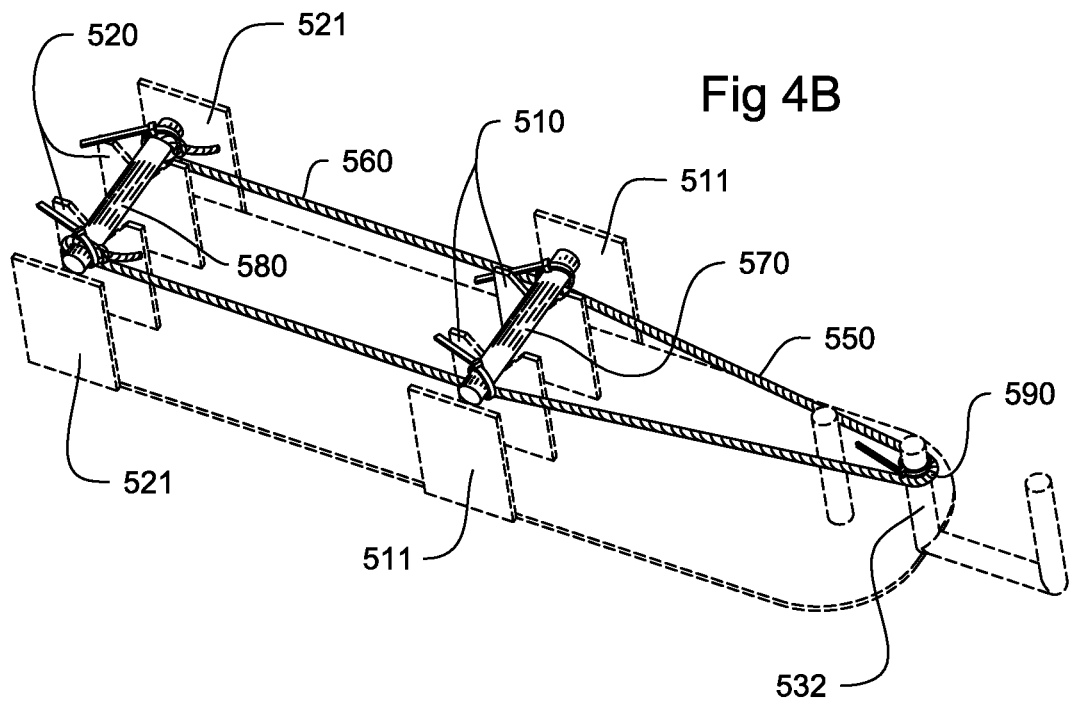
FIG. 4B is a view of the handle shown in FIG. 4 assembled onto the frame shown in FIG. 4A.
Figure 5:
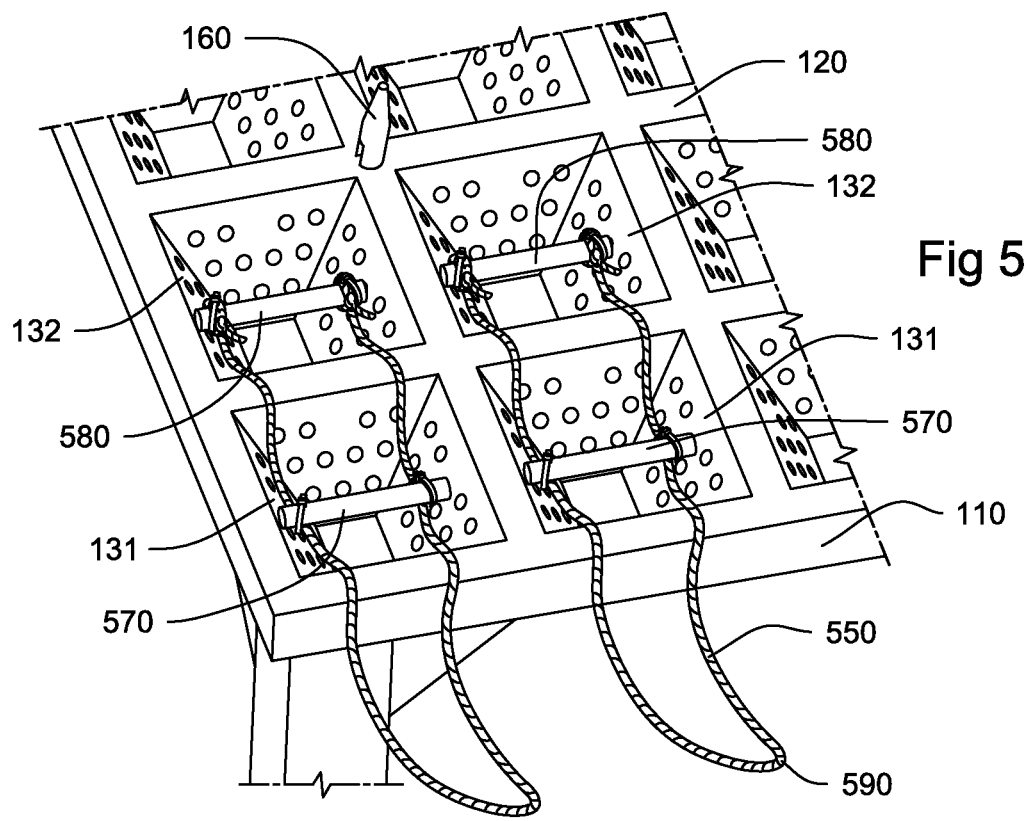
FIG. 5 is view of a portion of the mold shown in FIG. 1 containing two of the handles shown in FIG. 4.

FIG. 4B is a perspective view of handle 550 constructed on handle frame 500. In various embodiments, handle 550 may be positioned adjacent mold 100 prior to positioning composite fill 800 in plurality of block casting volumes 700. In various embodiments, handle 550 is positioned adjacent mold 100 before grid 200 is positioned adjacent mold 100.

Figure 8:
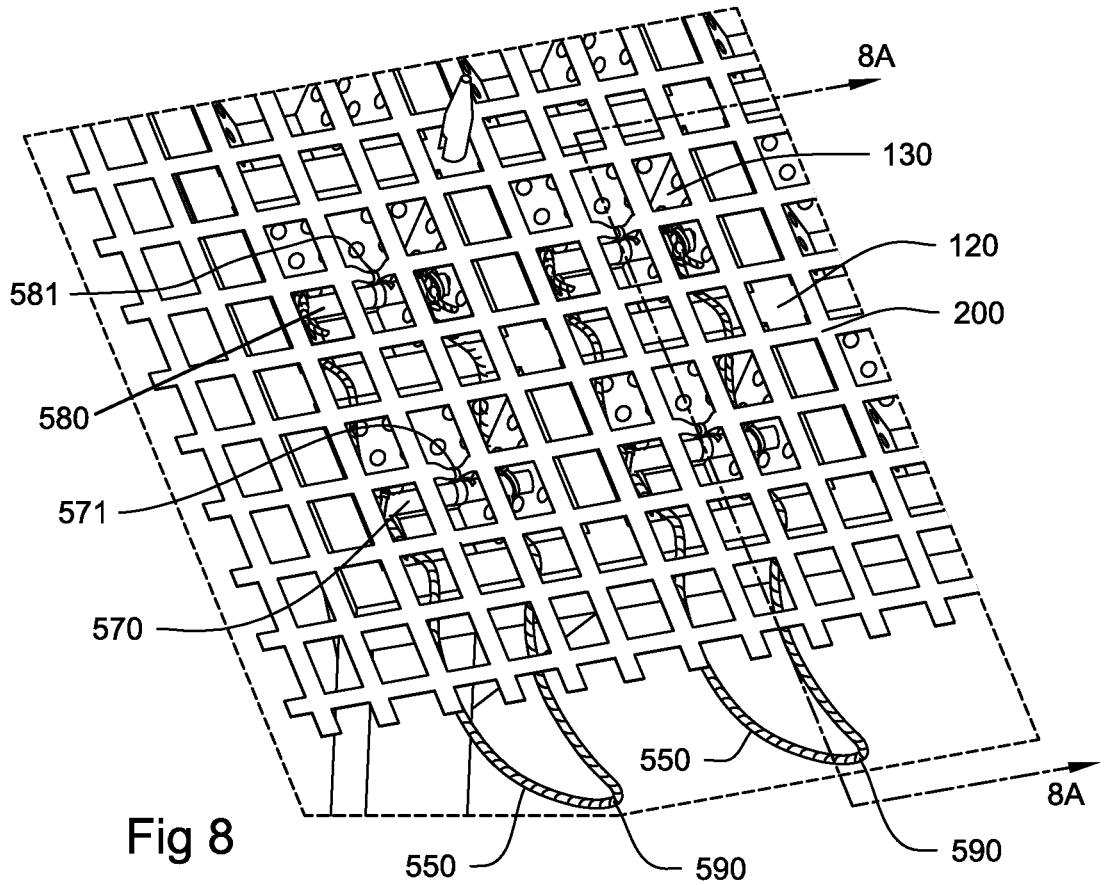
FIG. 8 is a view similar to FIG. 7, wherein two handles, each similar to the one shown in FIG. 4, are tied to the grid.
Figure 8A:
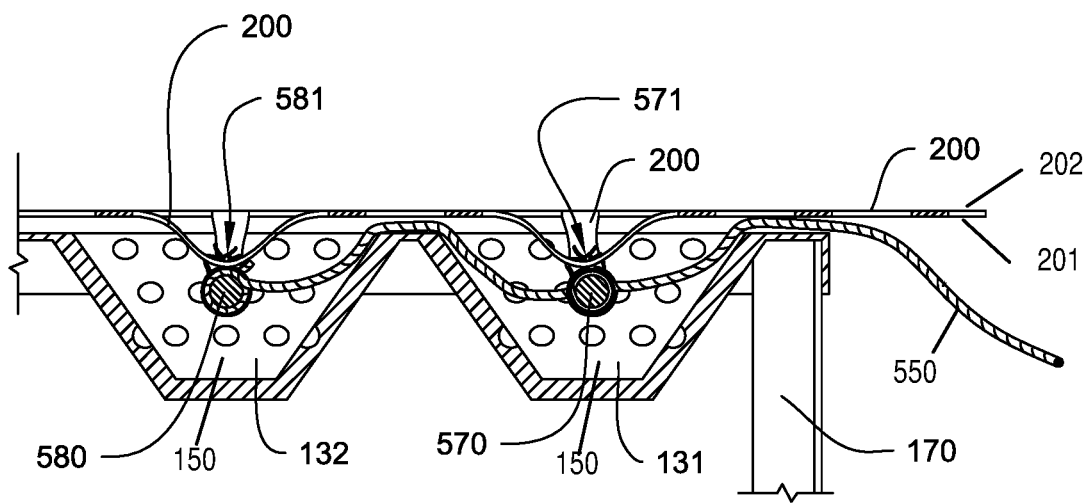
FIG. 8A is a view down line 8A shown in FIG. 8 showing the cross section of two adjacent casting impressions, wherein the handle is tied to the grid.

Viewing now FIG. 8, in various embodiments, first and second anchors 570, 580 are secured to grid 200 via first and second anchor ties 571, 581.

In various embodiments, frame 300 is secured to second side 202 of grid 200 and to the mold surface 120 of mold 100. Now viewing FIG. 2, in various embodiments, mold 100 further comprises at least one aligner 160 affixed to the mold surface 120. Now viewing FIG. 9, in various embodiments, said frame 300 comprises an aligner receiver 320. In various embodiments, when first side 201 of grid 200 is positioned adjacent to mold 100 and frame 300 is positioned adjacent second side 202 of grid 200, aligner 160 and aligner receiver 320 engage with one another to align the plurality of casting passage 310 of frame 300 with plurality of casting impression openings 134 of mold 100.

Figure 12:
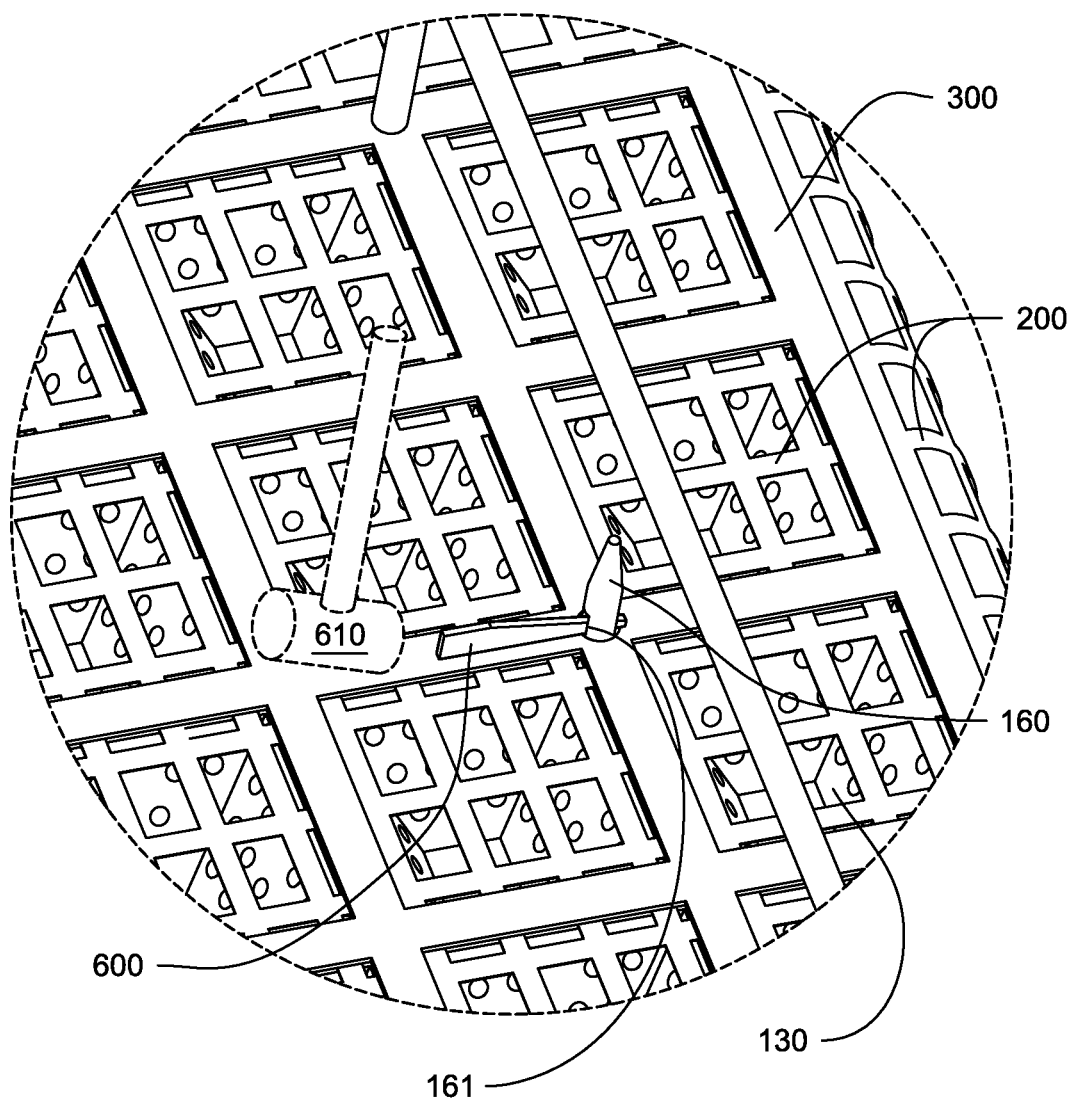
FIG. 12 is a view of the wedge shown in FIG. 11 securing the frame to the grid and mold.

Now viewing FIG. 2, in various embodiments, aligner 160 further comprises slot 161. Now viewing FIG. 12, when first side 201 of grid 200 is positioned adjacent to mold 100 and frame 300 is positioned adjacent second side 202 of grid 200, frame 300 may be secured to grid 200 and mold 100 by hammering 610 wedge 600 through slot 161.

In various embodiments, when the plurality of block casting volumes 700 are being filled with composite fill 800, a portion of composite fill 800 may collect on second side of body 301 of frame 300. Composite fill 800 collecting on second side of body 301 of frame 300 is problematic as it is wasteful and may inhibit separation of revetment mat 1000 from mold 100 and frame 300.

Figure 14:
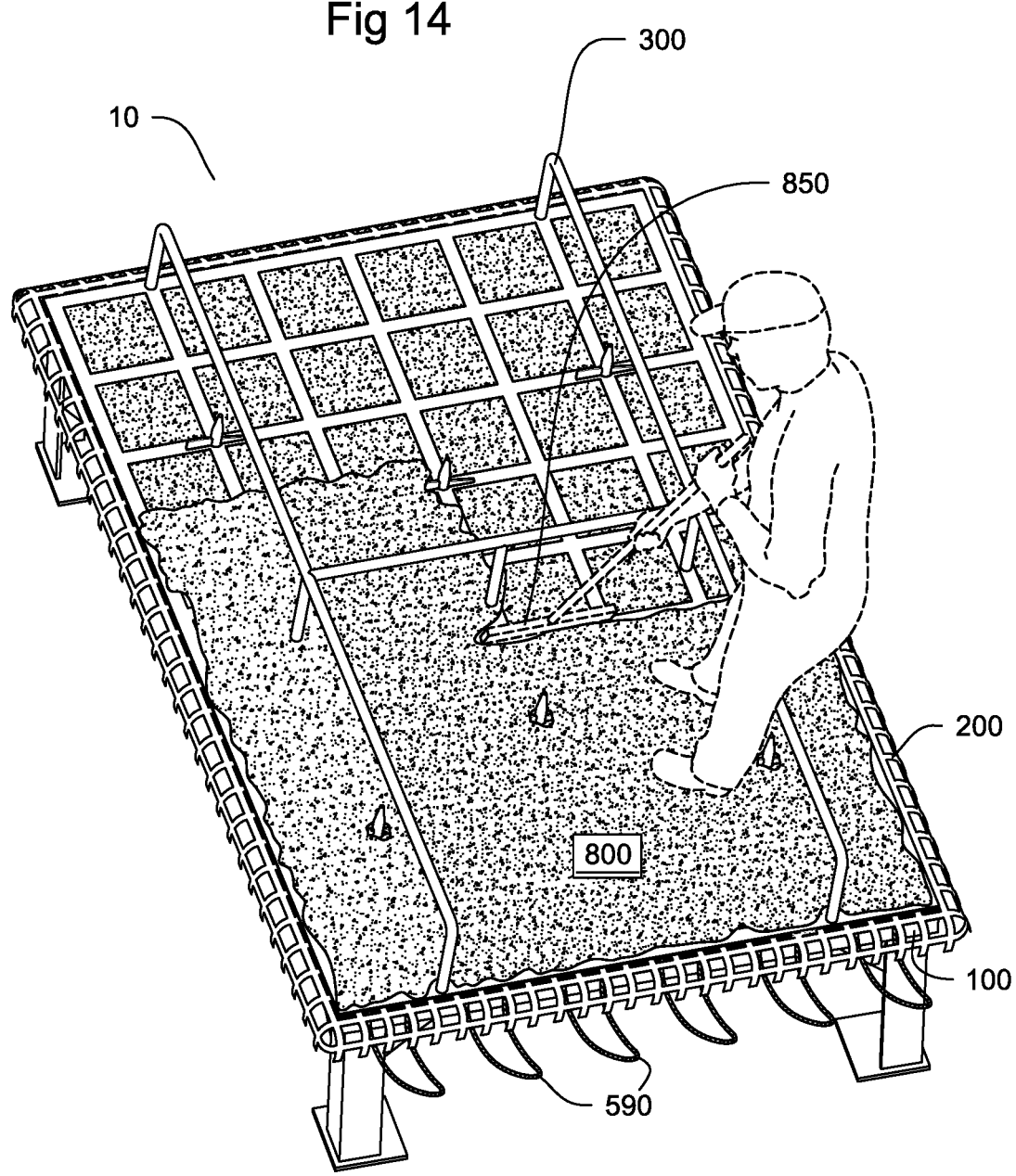
FIG. 14 is a view of a person screening the composite fill across the top surface of the frame.
Figure 15:
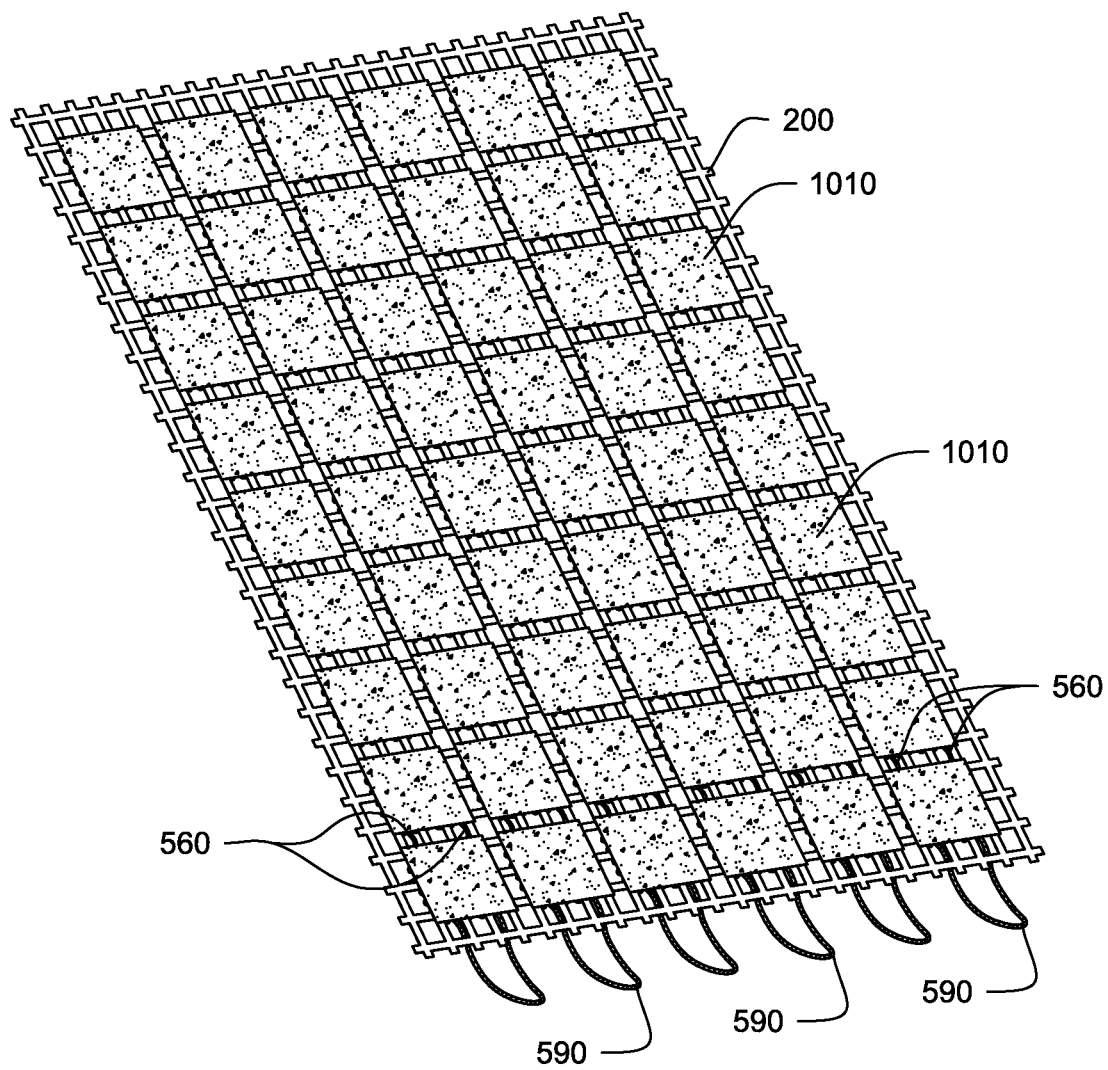
FIG. 15 is a view of one embodiment of a revetment mat formed using the mold, the grid, and the frame shown in FIG. 13.
Figure 16:
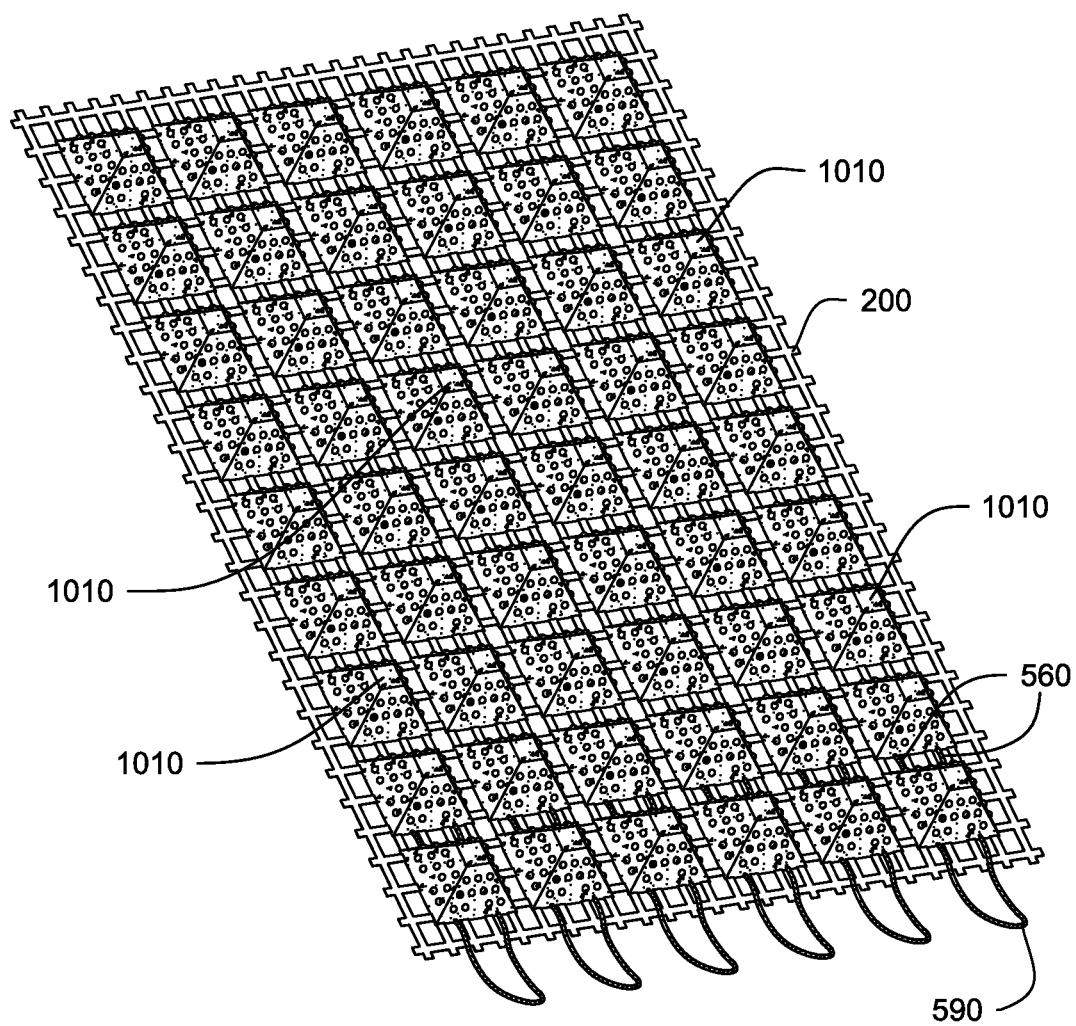
FIG. 16 is another view of the revetment mat shown in FIG. 15.
Figure 22:
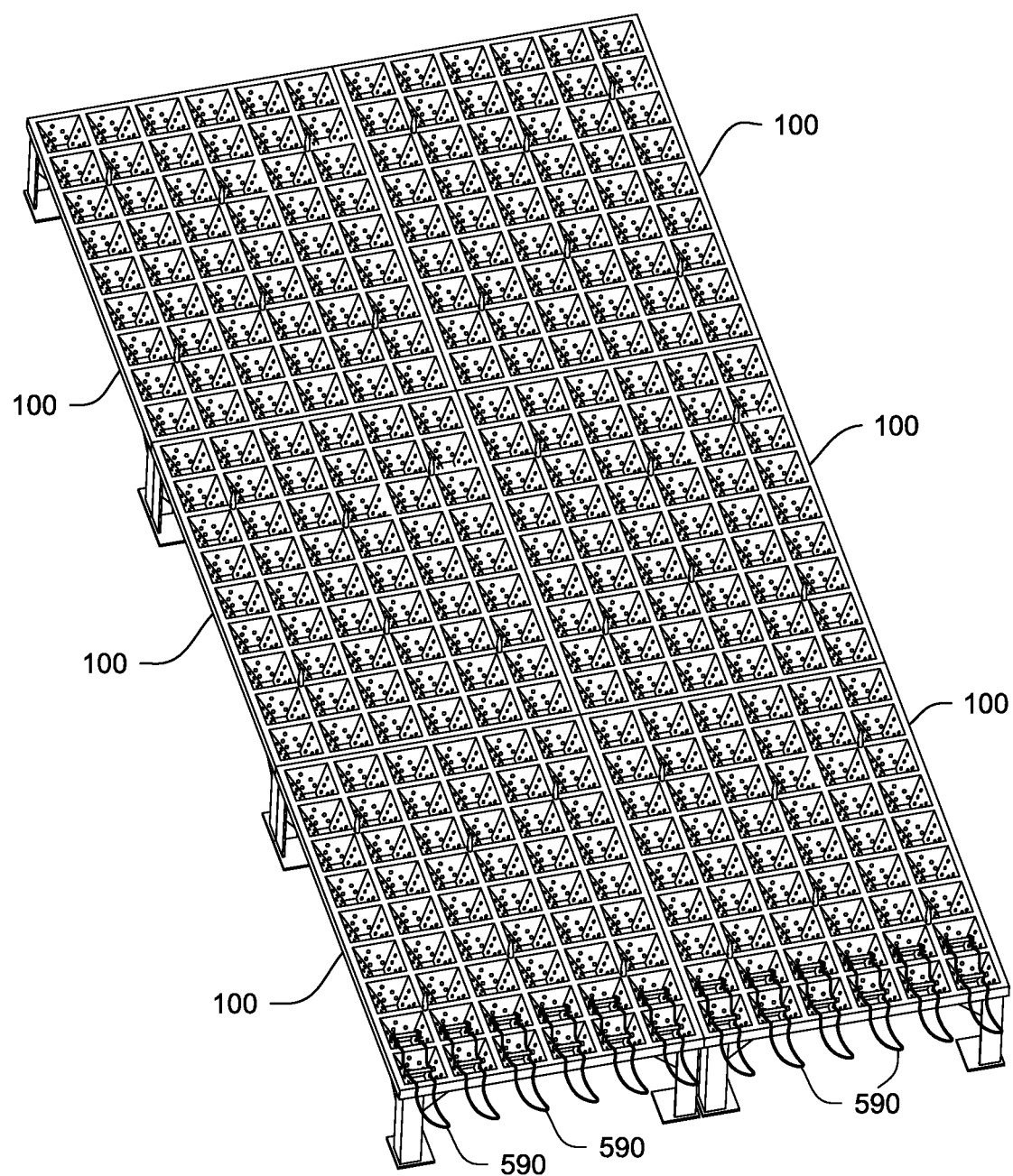
FIG. 22 is a view of six molds, each mold similar to the one shown in FIG. 1, positioned adjacent one another in a two by three pattern.

In order to prevent composite fill 800 from collecting on second side of body 301 of frame 300, in various embodiments composite fill 800 not positioned within any casting impression volume 130 is either repositioned within a casting impression volume 130 or removed as excess. Viewing now FIG. 14, in various embodiments, screening 850 composite fill 800 across the second side of body 301 of frame 300 is a known method of either repositioning or removing composite fill 800.

Now viewing FIG. 17, in various embodiments, revetment mat 1000 is rolled for storage and shipping. To maintain rolled form during storage or shipment, straps 1002 may be used. Now viewing FIGS. 19 and 20, in various embodiments where revetment mat 1000 is rolled, revetment mat 1000 may be installed by unrolling revetment mat on earthen surface 2000 with gradient 2001. As depicted in FIG. 19, stakes 3000 may be used with hold 590 of handle 550 to install revetment mat 1000. As depicted in FIG. 20, hold 590 of handle may be used to install revetment mat 1000. As depicted in FIG. 21, heavy lifting equipment 4000 may be used to install revetment mat 1000.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

We claim:

1. A method to produce a revetment mat comprising the following steps of:
   (a) positioning a first side of a grid adjacent to a mold, said grid comprising a plurality of elements extending from an edge, and a plurality of apertures between said plurality of elements; and said mold comprising a sidewall having a mold perimeter, a mold surface affixed to said side wall, and a casting impression affixed to said mold surface, said casting impression comprising an impression wall affixed to said mold surface, an opening at the mold surface, and a casting impression volume fluidly connected to said opening; wherein when said first side of said grid is positioned adjacent to said mold, said opening of said casting impression is adjacent said grid;
   (b) positioning a frame adjacent a second side of said grid, said frame comprising a body and a passage passing through the body and having a passage volume; wherein when said first side of grid is positioned adjacent to said mold and said frame is positioned adjacent said second side of said grid, said passage volume is fluidly connected to said casting impression volume to form a block casting impression;
   (c) positioning a handle adjacent said mold, said handle comprising a first anchor positioned within a first casting impression, a hold positioned beyond any casting impression volume, and a tether connecting said first anchor to said hold;
   (d) filling said block casting volume with composite fill;
   (e) allowing said composite fill to cure for a predetermined amount of time to form a revetment mat; and
   (f) removing said revetment mat from said mold and said frame.

2. The method of claim 1 wherein said handle further comprises a second anchor positioned within a second casting impression volume of mold and connected to the first anchor by said tether.

3. The method of claim 1 further comprising the following step of securing said first anchor to grid.

4. The method of claim 1 further comprising the following step of, before step d, removing composite fill not positioned within said casting impression volume from frame.

5. The method of claim 1 wherein said plurality of elements of said grid comprises polypropylene fibers.

6. The method of claim 1 wherein said plurality of apertures has an aperture radius between 0.75 inches and 1 inch.

7. The method of claim 1 further comprising the following step, after step e, rolling said revetment.

8. The method of claim 1 wherein said composite fill comprises wet-cast Portland cement.

9. The method of claim 1 wherein said mold further comprises an aligner affixed to the mold surface within the mold perimeter, wherein said frame further comprises a receiver affixed to the body, and wherein when said first side of grid is positioned adjacent to said mold and said frame is positioned adjacent said second side of said grid, said aligner and said receiver engage with one another to align said passage of said frame with said opening of said mold.

10. The method of claim 9 further comprising the following step of, before step c, positioning a wedge through a slot in said aligner and against said frame.

11. A method to produce a revetment mat comprising the following steps of:
   (a) positioning a first mold adjacent a second mold, each mold comprising a sidewall having a mold perimeter, a mold surface affixed to said side wall, and a plurality of casting impressions affixed to said mold surface; each casting impression comprising an impression wall affixed to said mold surface, an opening at the mold surface, and a casting impression volume fluidly connected to said opening
   (b) positioning a first side of a grid adjacent to the first and second mold, said grid comprising a plurality of elements extending from an edge, and a plurality of apertures between said plurality of elements; wherein when said first side of said grid is positioned adjacent to said first and second mold, each of said openings of said plurality of casting impressions of said first and second molds are adjacent said first side of said grid;
   (c) positioning a first and second frame adjacent a second side of said grid, each frame comprising a body and a plurality of passages passing through the body and having a passage volume; wherein when said first side of grid is positioned adjacent to said first and second mold and said first and second frame are positioned adjacent said second side of said grid, each passage of said first frame is fluidly connected to a casting impression of said first mold to form a first plurality of block casting volumes, and each passage of said second frame is fluidly connected to a casting impression of said second mold to form a second plurality of block casting volumes;
   (d) filling said first and second plurality of block casting volumes with composite fill;
   (e) allowing said composite fill to cure for a predetermined amount of time to form a revetment mat; and
   (e) removing said revetment mat from said first and second molds and said first and second frame.

* * * * *